United States Patent [19]
Richardson

[11] Patent Number: 5,830,036
[45] Date of Patent: Nov. 3, 1998

[54] CHAMBERED STRIKER TURKEY CALL, WITH OPTIONABLE CHAMBERED SIDE PANELS AND PIVOTABLE AND LOCKABLE SLIDE ACTION VARIABLE TONE SELECTOR

[76] Inventor: Max E. Richardson, 515 Woodslope Cir., Kodak, Tenn. 37764

[21] Appl. No.: 787,443

[22] Filed: Jan. 22, 1997

[51] Int. Cl.$^6$ ............................................. A63H 5/00
[52] U.S. Cl. ................................ 446/397; 446/418
[58] Field of Search ............................ 446/397, 415, 446/418, 421

[56] References Cited

U.S. PATENT DOCUMENTS

| | | | |
|---|---|---|---|
| D. 347,399 | 5/1994 | White, Jr. ................... | D10/116 |
| 3,793,767 | 2/1974 | Pulley ........................ | 446/397 |
| 4,343,108 | 8/1982 | Lee ............................ | 446/397 |
| 4,422,262 | 12/1983 | Moss ........................... | 446/418 |
| 4,664,641 | 5/1987 | Hearn et al. ................ | 446/397 |
| 4,846,753 | 7/1989 | Langston ..................... | 446/397 |
| 4,932,920 | 6/1990 | Hearn ......................... | 446/397 |
| 4,941,858 | 7/1990 | Adams ........................ | 446/397 |
| 5,380,235 | 1/1995 | Forbes et al. ............... | 446/397 |
| 5,484,319 | 1/1996 | Battey ........................ | 446/397 |

OTHER PUBLICATIONS

Author: Johnny Stewart® Wildlife Calls, Waco, Texas: Title: "Turkey Calls Products from the Leading Wildlife Call Manufacturer"; Date: Winter, 1994 Published in Turkey & Hunting, Winter, 1995, p. 50.

*Primary Examiner*—Robert A. Hafer
*Assistant Examiner*—Jeffrey D. Carlson
*Attorney, Agent, or Firm*—M. Alex Brown

[57] ABSTRACT

A sound chambered striker paddle member and a chambered striker box-type turkey call with chambered striker and optionable chambered side panels and a pivoting and locking slide, action variable tone selector with a diverse axes floating hinge is disclosed. The sound chamber of the striker paddle and side portions act as a speaker to enhance and amplify sound produced from any wildlife call employing frictionable side walls or camming surfaces. The floating hinge feature of the invention couples an internally chambered striker with a lower box-type call assembly so that multi-axis pivoting and sliding, frictionable interface can be achieved between preferred sound generating portions or points of the stiker and preferred sound generating portions or points along the frictionable width and lengthwise surfaces of box-type, open chamber side walls.

17 Claims, 14 Drawing Sheets

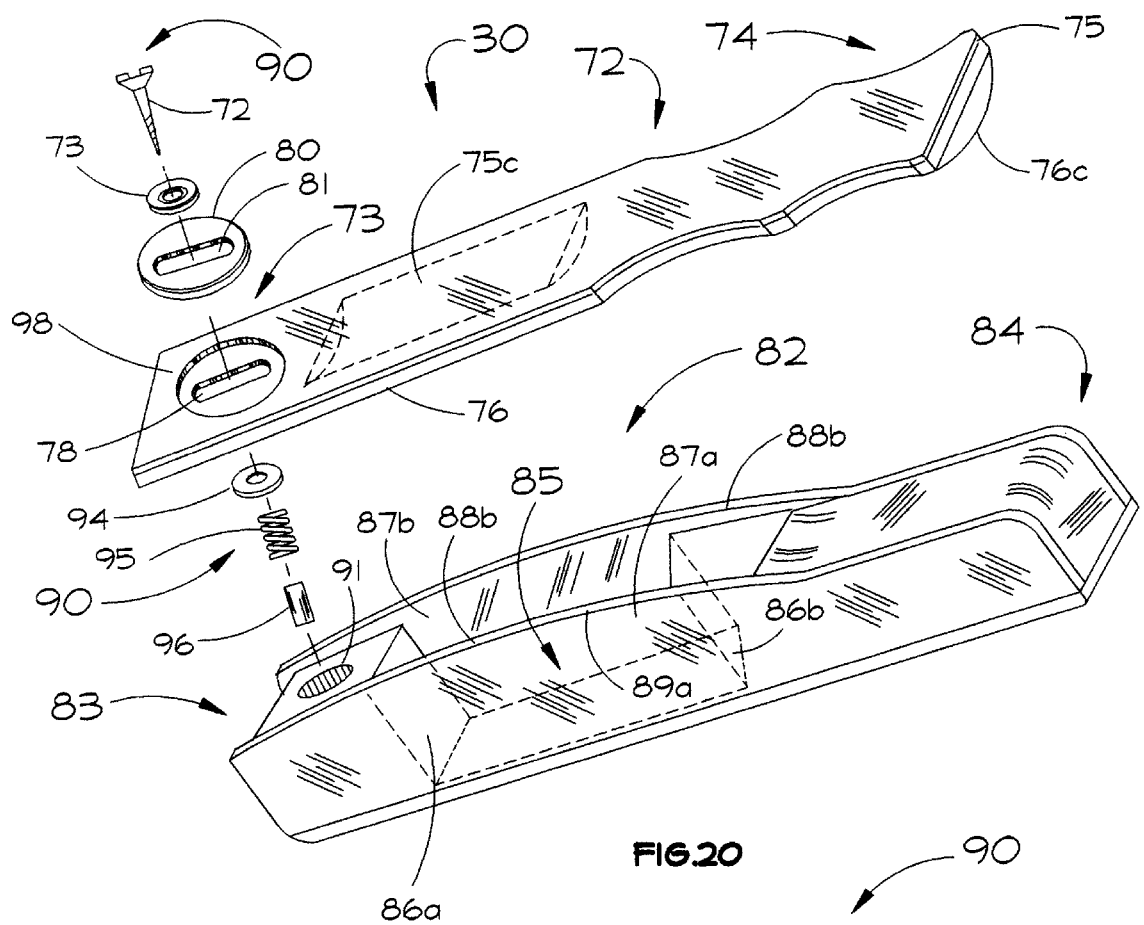
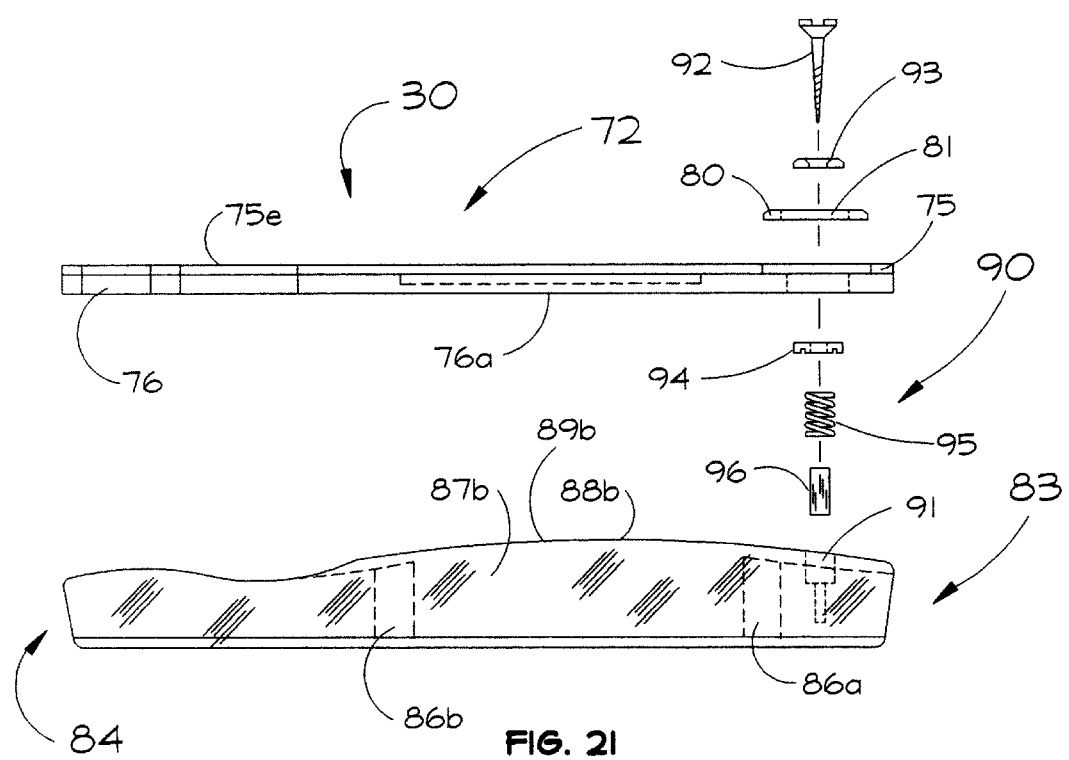

CHAMBERED STRIKER TURKEY CALL, WITH OPTIONABLE CHAMBERED SIDE PANELS AND PIVOTABLE AND LOCKABLE SLIDE ACTION VARIABLE TONE SELECTOR

BACKGROUND OF THE INVENTION

1. Field of the Invention

The invention relates to a friction-type, box-type turkey call device having a lower box portion and an upper striker panel portion which is attached to the box and moves to scrape, by frictional contact, a portion of the box to produce a sound similar to a live turkey or other bird.

2. Background Information

Typical of the prior art references related to box-type or other turkey call devices are U.S. Pat. Nos. to: Forbes et al. (5,380,235); Carraway (5,234,368); Adams (4,941,858); Hearn (4,932,920); White, Jr. (4,854,914); Langston (4,846,753); Wingate (4,648,852); Willis (4,606,733); Grayson (3,927,490); Shultz (3,738,056); Turner (3,607,452); Tribell (3,583,094); Johnson (3,419,996); Sanuders (1,034,307) and Gibson (574,534-utility); and Morningstar (360,160-design); White, Jr. (347,399; White, Jr. (313,768); and Morocco (296,880); each of which was located during the course of a patent search. Additionally, in a publication entitled "Turkey & Turkey Hunting," Winter-1995 edition, a reference is located, disclosing a device entitled a "JOHNNY STEWART DOUBLE TONE BOX CALL" (Trademark, Johnny Stewart (R) used by Johnny Stewart Wildlife Calls, P.O. Box 7594, Waco, Tex. 76714-7594).

The Forbes '235 patent discloses a turkey box call adapted to prevent emission of inadvertent sounds, alarming prey. No separate internal chambering is provided inside this devices's striker portion. The Forbes device does disclose an open-ended channel or resonating cavity for the purpose of resonating and emitting sound when its striker portion is rubbed against its camming surface, but has no separate internally defined side panel chamber for doing this. Nor does this device have any sliding or moving means to select or vary within a range of choices the sound or tone produced by this box call. Additionally, this device is much larger and more bulky than other typical box type calls, with greater complexity of construction.

The Adams '858 device discloses in part a box-type turkey call, but is only provided with a single acoustical sound chamber, and has no pivotable and slideable means for varying the tone and sound produced by this device. This device also suffers from being larger, more bulky and containing more parts, including parts than can be misplaced or lost, than is found in typical turkey box calls, or with respect to the present invention.

The Langston '753 patent discloses a turkey call with a sound chamber, having an upwardly open sound box of a generally rectangular shape (of the type characteristic of most box-type calls) which, then, overlies and is coupled to a generally (but not completely) closed sound box, below the open sound box, with which the open box shares a common wall. This common wall extends laterally from the lower edges of the sidewalls of its open box to form a cover over its closed sound box, so that the sound produced when this device is utilized is transmitted to its closed sound box for the purpose of attempting to modify in its closed sound box the tonal quality and amplification of the sound being produced.

The Langston device is also disclosed as being singificantly larger and more heavy than what would normally be characteristic for a practical box-type call. The lower closed sound box also includes, in fact, a pair of narrow slots formed in the lateral extensions of its wall away from the open sound box; and is, therefore, not a completely closed chamber, but a lower chamber with sound holes likening itself to the chambered body of a violin or guitar.

Other references have utilized some general form of a inwardly adapted or artifically or temporarily created sound chamber, but have been of a breath-activated, pneumatic type, or a slate-type call, employing very different functions and construction than conventional box-type calls, or the present invention.

Additionally, several ornamental designs have disclosed a narrow, open-ended channel along the side walls of a box-type call, such as the White '399 design, but have not utilized a completely or substantially enclosed chambering means in the striker and/or side panels to enhance the tone and quality of sound produced by friction of a striker member against side panel surfaces.

Also, at least one published reference, noted above, has disclosed three blades containing therebetween two open chambers directly adjacent to areas to be scraped in a friction-type manner by a striker. And in what appears to be a crowded art many attempts have been made to improve box-type, slate type, latex, pneumatic and wing bone varieties of various turkey calls.

None of the references found specifically illustrates the chambered striker turkey call with options of the present invention. Nor is the present invention obvious in view of any of the prior art references listed. In addition, all of the relevant prior art heretofore known suffer from a number of disadvantages.

None of the apparently crowded, prior art references teach concepts which provide a relatively simple turkey call of characteristic size and weight, or smaller, which has the operative capacity to provide sharp and resonant sounds, enhanced by chambered striker or side panels, simulating those of a living turkey or other wildlife, while also providing the capacity to effectively and easily, through slideable and positionable means, vary the tone of the sound produced over a wide spectrum of life-like sound so as to be able to simulate male and female, and young and older birds in a turkey wildlife population, or other wildlife.

In the past, there have been many problems in design and construction associated with attempting to provide a box-type turkey call device which would have the capacity of providing a more qualitative tone and resonance of sound. None of the past devices have truly had the functional option of varying the sound qualities produced by the striker when it makes frictional inerface with an arched or cammed surface portion of a box-type side panel, by in fact slideably changing the lengthwise or horizontal positional locations of such actual interface of the striker with the side panel wall to change the effect of the sound made along this axis, and to take advantage of key or critical positional sound points along the edge or surface of a side panel or cammed surface.

Additionally, none of the prior art devices have utilized a completely closed sound chamber in the striker member of a box-type call; nor have they utilized a completely closed chambering within side panels of such a call; for the purpose of improving resonance quality or volume, or clearness, quality or tone, in attempting to more accurately simulate the sound of a live turkey or other bird or animal.

These and other disadvantages, structurally and functionally, of the prior art will become apparent in reviewing the remainder of the present specification, claims and drawings.

Accordingly, it is an object of the present invention to provide a substantially improved box-type turkey call having substantially enhanced acoustic volume, tone and resonance by virtue of its specially adapted closed chambering system provided within preferred internal portions of a striker panel or member, and optionally within box-type side panel sections, with a closed or covered chambering.

It is a further object to provide a box-type turkey call having the user-friendly, practical utility of providing with a turkey call of traditional or characteristic size and weight, or smaller, a pivotable and lockable slide action variable tone selector system utilizing the striker and arched top portions of side panels, which will allow the user to easily produce a substantially wider range of wildlife sounds and intonations, or intonation patterns; and which is easily constructed or manufactered.

It is yet a further object of the present invention to provide a special hinge facilitating the attachment of a striker to a frictionable box-type call which will provide the user with the ability to take the striker through a wide range of movement, such as left, right, forward and backward (horizontally), up and down (vertically) and tilting positions to assist, by virtue of changing the locational interface of bottom portions of the striker with top frictionable portions of side panels, in spaced positional relation to the strike point or highest arch point, or vertical positioning of the side panels, for producing multiple tones and sounds, and both high and low pitches.

It will, therefore, be understood that substantial and distinguishable structural and functional advantages are realized in the present invention over the prior art devices.

SUMMARY OF THE INVENTION

The foregoing and other objects of the invention can be achieved with the present invention device, system and assembly which is a chambered striker wildlife call assembly for generating wildlife sounds. The invention is provided with a striker member subassembly having first: and second end-portions and top and bottom sections affixed to and adjoining one another. The first end portion and the bottom section of the striker subassembly are provided with a souund chamber channel which is covered by the attached and adjoining top section of the striker subassembly. The first end-portion of the striker subassembly is provided with an elongate pivot hinge channel. Additionally the striker subassembly is provided with an upper hinge support member having a channel generally confruent to that of the elongate pivot hinge channel of the striker. The invention is also provided to work in combination with a lower box subassembly, which can be any of a number of available box-type turkey or wildlife lower box assemblies, having an open sound chamber with a first pair of opposing side walls and a second pair of opposing side walls, with each of the second pair of opposing side wall having an upper widthwise surface having a range of points of accessible contact and a middle portion-oriented strike point where a midrange of preferred sound is produced upon friction-type contact. Additionally, the first end of the lower box subassembly is provided with a hinge coupling space for receipt and installation, allowing pivotal and slideable movement, of the striker subassembly of the invention. The invention is further provided with a coupling hinge means subassembly for pivotably and slideably attaching the striker subassembly of the invention to the lower box subassembly. This coupling hinge means subassembly extends through and retains the channel of the upper hinge support member of the striker, the elongate pivot hinge channel of the striker and the hinge coupling space of the lower box subassembly so that the bottom section of the striker can make optionable, friction-like and releasable contact with either of the second pair of opposing side walls of the lower box subassembly at preferred variable location along the range of points of accessible contact and the strike point on the upper widthwise surface of either of the second pair of opposing side walls of the lower box subassembly to generate a substantially greater variable range of wildlife sounds.

BRIEF DESCRIPTION OF THE DRAWINGS

FIG. 20 is a perspective view of a preferred embodiment of the novel chambered striker turkey call with optionable pivotable and lockable slide action variable tone selector of the present invention, showing in hidden broken lines the chambering of the striker paddle of the invention and an open box chamber of the invention.

FIG. 21 is a side view of the preferred embodiment of FIG. 20.

REFERENCE NUMBERS IN DRAWINGS

Figure 1:
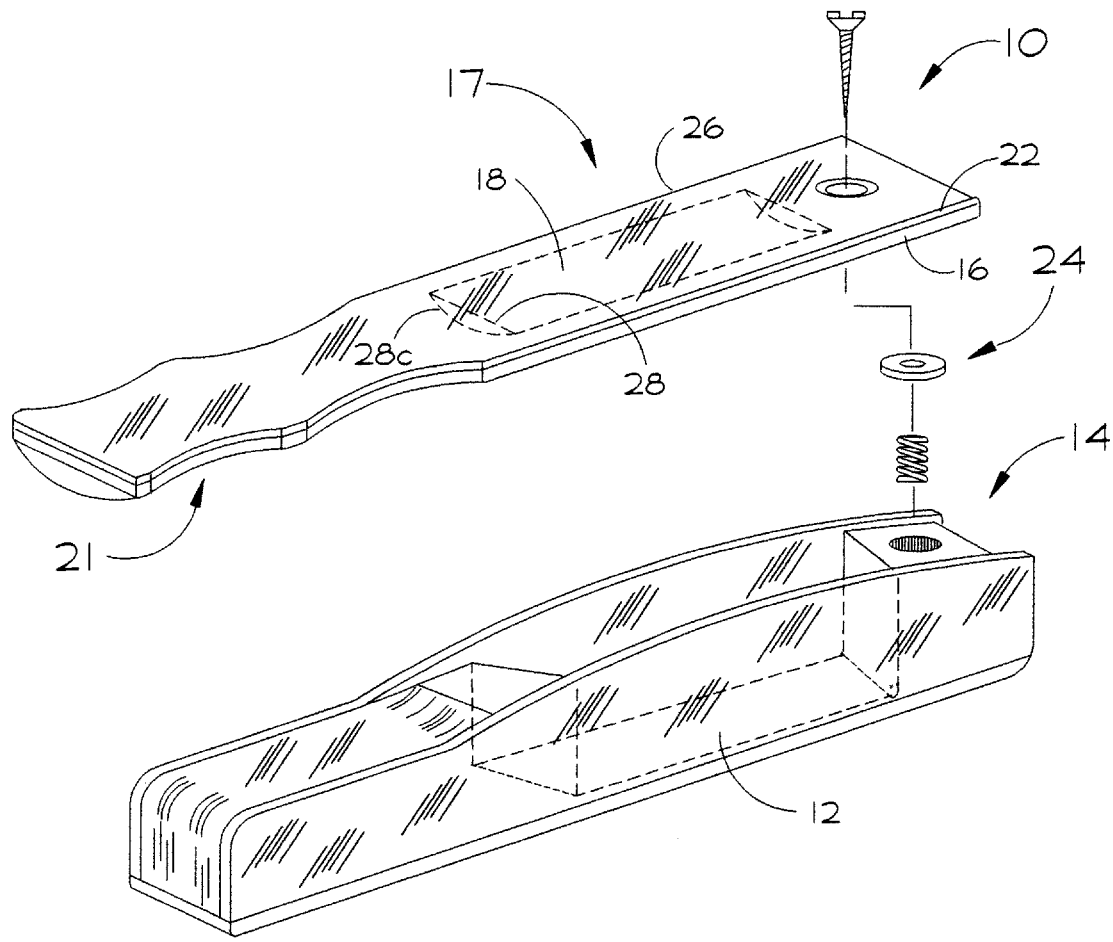
FIG. 1 is a perspective view of a preferred embodiment of the novel chambered striker turkey call of the present invention.
Figure 2:
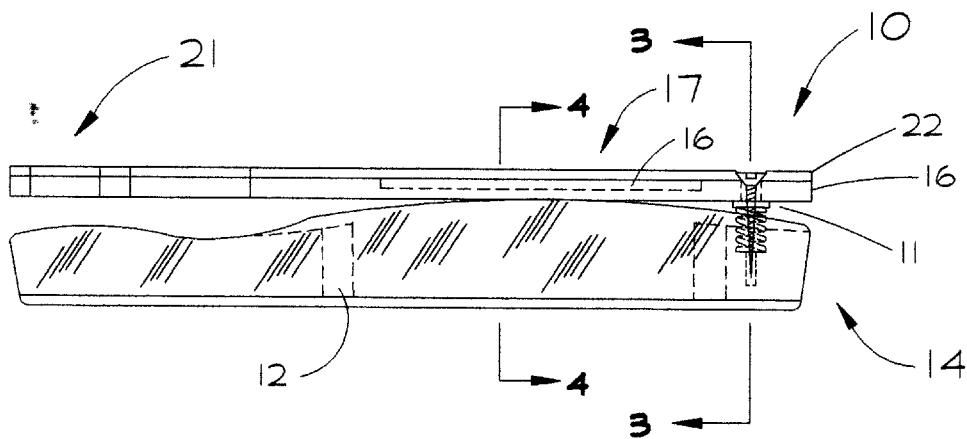
FIG. 2 is a reduced scale side view of FIG. 1.
Figure 3:
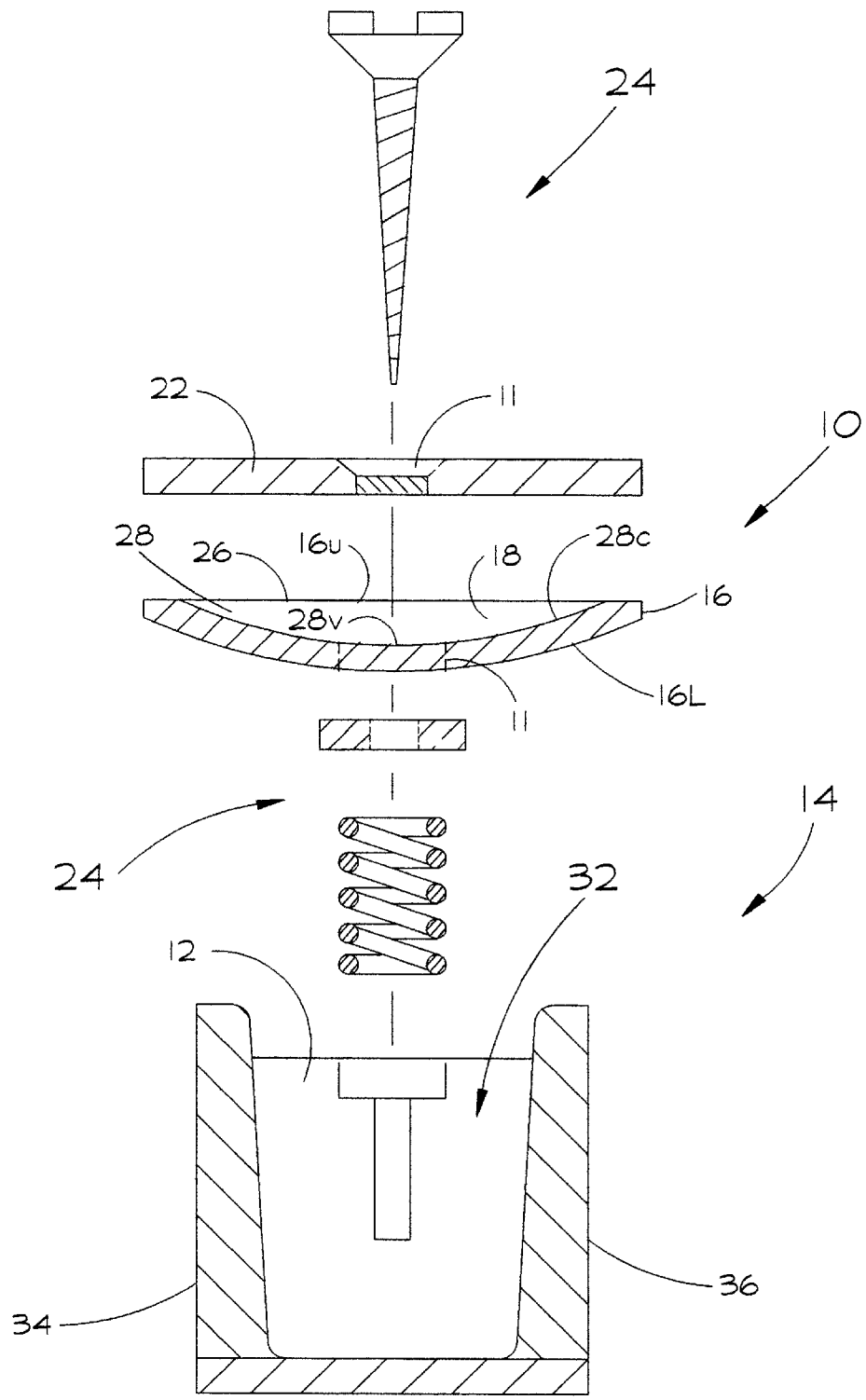
FIG. 3 is an enlarged scale cross-sectional view taken along line 3—3 of FIG. 2.
Figure 4:
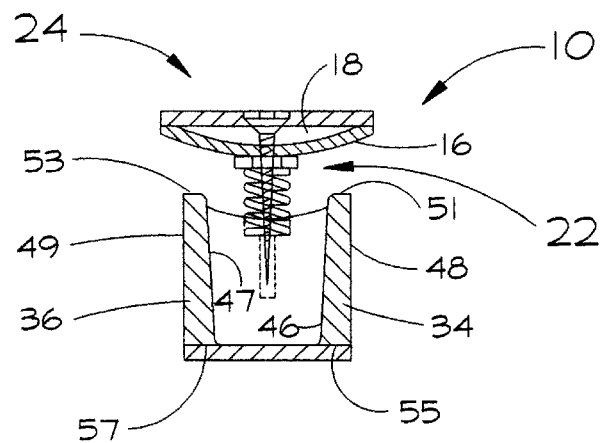
FIG. 4 is an enlarged scale cross-sectional view taken along line 4—4 of FIG. 2.
Figure 5:
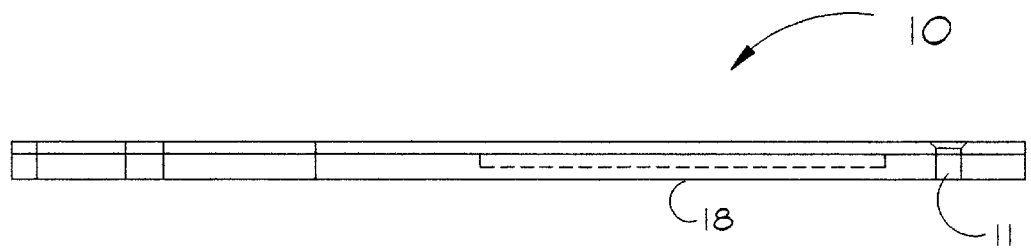
FIG. 5 is a side view of a preferred embodiment of the chambered striker paddle of the present invention.

10 Chambered Striker Paddle Member
11 attachment hole (of 10)
12 friction type box
14 lower box subassembly of a turkey box call
16 bottom section (of 10)
16u external upper surface portion (of 16)
16L external lower surface portion (of 16)
18 sound chamber channel (of 10)
17 front end-portion (of 16)
21 handle/end-portion (of 16)
22 top section (of 10)
24 conventional mounting or attachment means subassembly
26 first portion elongate axis segment (of 18)
28 second portion widthwise axis segment (of 18)
28c curved/or arcuate bottom surface (of 28)
28v vertex center arc point (of 28c)
20 chambered side panel lower box subassembly
32 open box sound chamber (of 20)
34 first long side wall (of 32)
36 second long side wall (of 32)
37 first short side wall (of 32)
39 second short side wall (of 32)
42 first closed side chamber
44 second closed side chamber
46 inside wall (of 34)
47 inside wall (of 36)
48 outside wall (of 34)
49 outside wall (of 36)
51 upper widthways end (of 34)
53 upper widthways end (of 36)
55 lower widthways end (of 34)
57 lower widthways end (of 36)
58 upper arcuate portion (of 42)
59 upper arcuate portion (of 44)
61 lower flat portion (of 42)
62 lower flat portion (of 44)
30 Chambered Striker Turkey Call with Options
72 variable tone striker member subassembly
73 first end-portion (of 72)
74 second end-portion (of 72)
75 top paddle section (of 72)
76 bottom paddle section (of 72)
78 elongated pivot hinge channel (of 72)
78F first slideable position
78S second slideable position
80 upper hinge support member (of 72)
81 inner channel (of 80)
82 lower box subassembly (of 30)
83 first end (of 82)
84 second end (of 82)
85 open sound chamber
86a,86b first pair of opposing side walls (of 85)
87a,87b second pair of opposing side walls (of 85)
88a widthwise surface (of 87a)
88b widthwise surface (of 87b)
89a center or middle portion strike point (of 88a)

89b center or middle portion strike point (of 88b)
91 hinge coupling cylinder-like space
90 Coupling Hinge Means Subassembly
75e generally or completely flattened surface (of 75)
76e generally curved or completely arcuate surface (of 76)
[28c curved or arcuate bottom surface]
[28v vertex center arc point]
92 pin securement and coupling member (of 90)
93 upper washer member (of 90)
94 lower washer member (of 90)
95 spring oriented biasing member (of 90)
96 collar member
98 support channel (of 72; for 80)
99 first position (of 80)
100 second or locked position (of 80)
102 left half corner portion (of 80)
104 right half corner portion (of 80)
106 pivot hinge channel seating collar (of 81)
110 lower hinge support member
112 left bottom corner portion
114 right bottom corner portion
116 lower inner channel
120 flange collar member (of 80)
122 flange channel (of 120)

DETAILED DESCRIPTION OF THE PREFERRED EMBODIMENTS OF THE INVENTION

The following description of the preferred embodiments of the concepts and teaching of this invention is made in reference to the accompanying figures.

Referring now to the drawings, FIGS. 1 through 12, and 27, thereof, there is shown a chambered striker paddle member 10, of the present invention which is used in combination with a friction-type box 12 of a lower box subassembly 14 of turkey box call or other wildlife call. The striker member 10 is provided with a bottom section 16 which houses or contains a front end-portion 17, a sound chamber channel 18 and a handle end-portion 21. The striker 10 is also provided with a top section 22 which is attached to the bottom section 16, and merges or is concurrent with the perimeters of the bottom section 16, as illustrated in FIGS. 6, 10, 11 and 12. However, it is within the spirit of the invention for the top section 22 to have different dimensions and perimeters from those of the bottom section 16. The bottom and top sections, 16 and 22, preferably, however, form together the handle end-portion 21; and preferably the top section is substantially flat. The striker 10 is also provided in one preferred embodiment with an attachment hole 11 which can work in combination with a conventional mounting or attachment means subassembly 24 for the purpose of mounting the striker 10 on to the lower box subassembly 14 of a box type call, as illustrated in FIGS. 1 through 4. Additionally, the striker 10 can work in combination with other types of mounting or attachemnt systems utilized in a box-type friction wildlife call.

The sound chamber channel 18 of the present invention is provided with a first portion elongate axis segment 26; and a second portion widthwise axis segment 28 having a curved or arcuate bottom surface 28c.

In one preferred embodiment the sound chamber channel 18 can be provided in congruent configurational or in similar but reduced scale, configurational relation to the curved configuration of the striker paddle member 10, as illustrated in FIGS. 3, 4, 11 and 12.

In one preferred embodiment of the invention the bottom section 16 and the top section 22 of the striker 10 are provided as laminate panel sections to be securely fitted together as illustrated in FIGS. 1, 2, 3, 4, 5, 6, 10, 11 and 12. As illustrated in FIGS. 1 through 4, in one preferred embodiment of the invention, the curved or arcuate surface 28c can define a positional relationship when the striker 10 is mounted on the lower box subassembly 14 of facing or interfacing with the subassembly 14 in a tangentially proximate relation or manner. Additionally, when the bottom and top sections, 16 and 22, respectively, are fixed together the sound channel 18 is provided, as is desired in the spirit of the invention, as being completely closed and enclosed by the top section 22, so that the sound channel 18 is provided in the striker 10 as a completely or substantially closed sound chamber within the striker 10.

Figure 6:
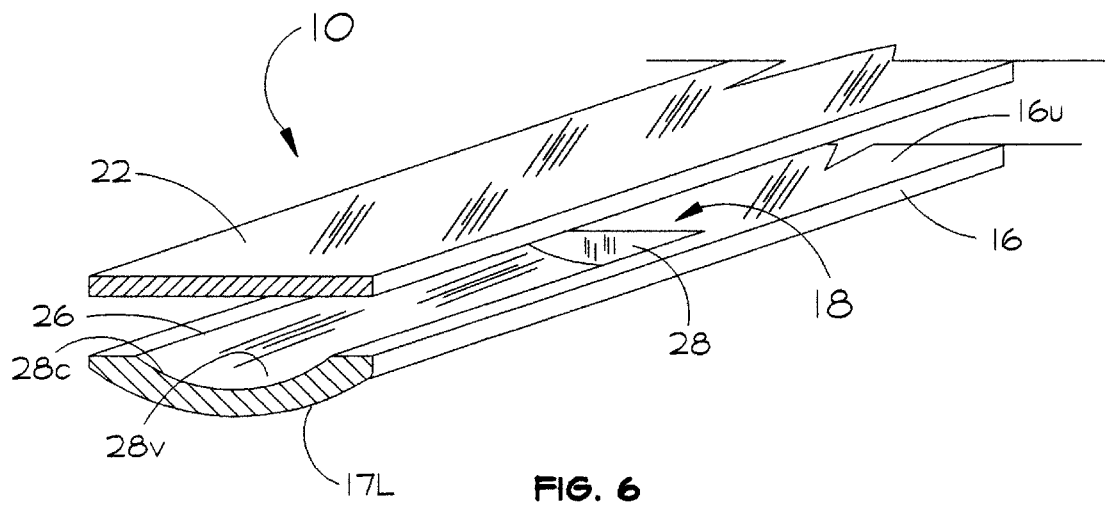
FIG. 6 is an exploded cross-sectional partial perspective view of a preferred embodiment of the striker paddle of the present invention.
Figure 7:
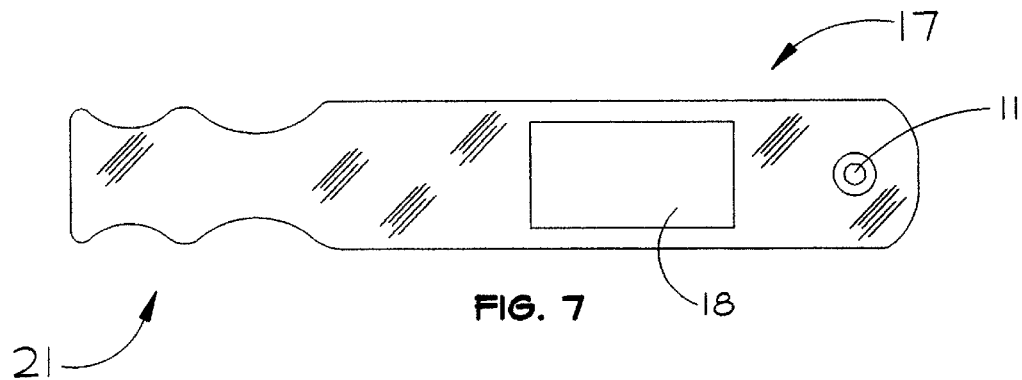
FIG. 7 is a top plan view of the lower laminate section of a preferred embodiment of the striker paddle of the present invention.
Figure 8:
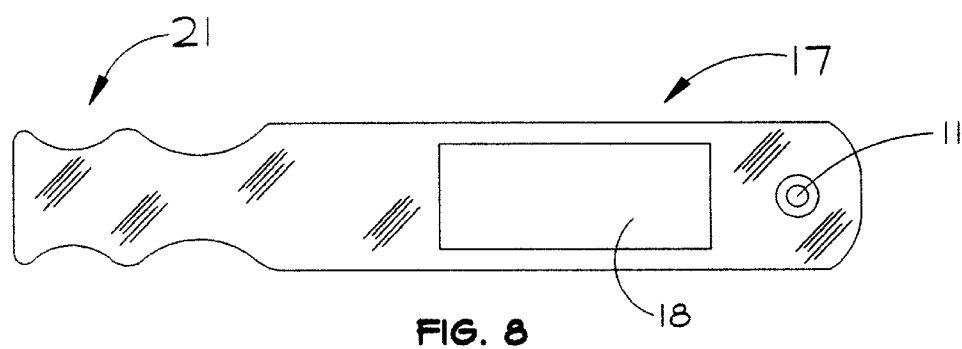
FIG. 8 is a top plan view of the lower laminate section of another preferred embodiment of the striker paddle of the invention.
Figure 9:
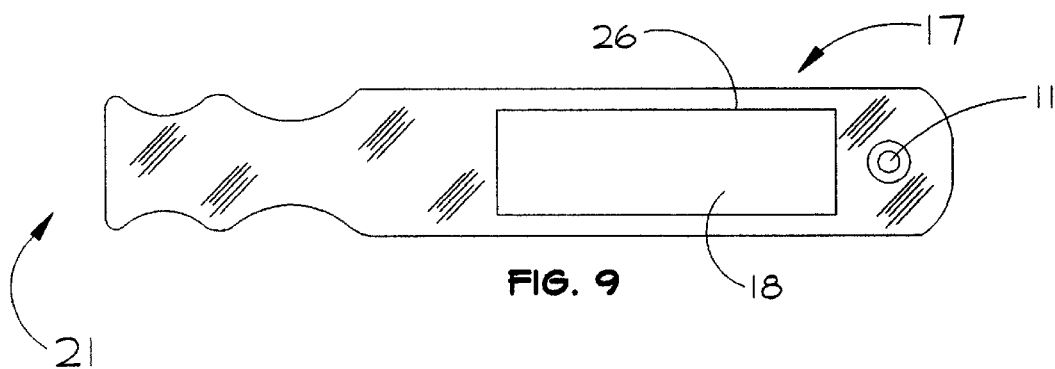
FIG. 9 is a top plan view of the lower laminate section of yet another preferred embodiment of the striker paddle of the invention.
Figure 10:
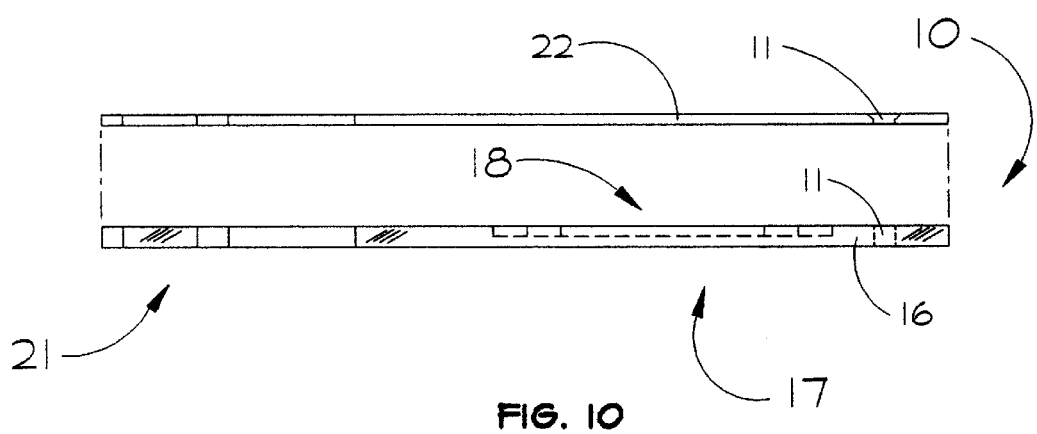
FIG. 10 is an exploded side view of upper and lower laminate sections of a chambered striker paddle of the invention showing by hidden broken lines a composite of the internal chambering of the preferred embodiments of the striker paddle of FIGS. 7, 8 and 9.
Figure 11:
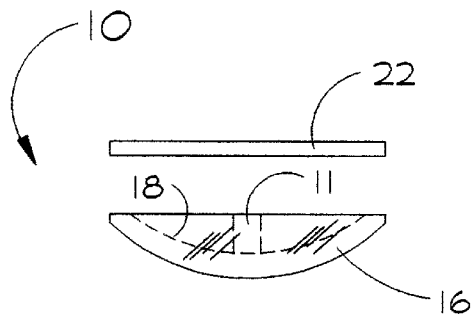
FIG. 11 is an enlarged scale front view of the striker paddle of FIG. 10.
Figure 12:
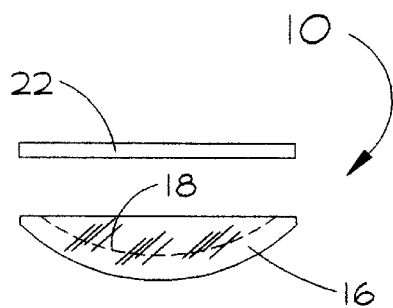
FIG. 12 is an enlarged scale back view of the striker paddle of FIG. 10.
Figure 27:
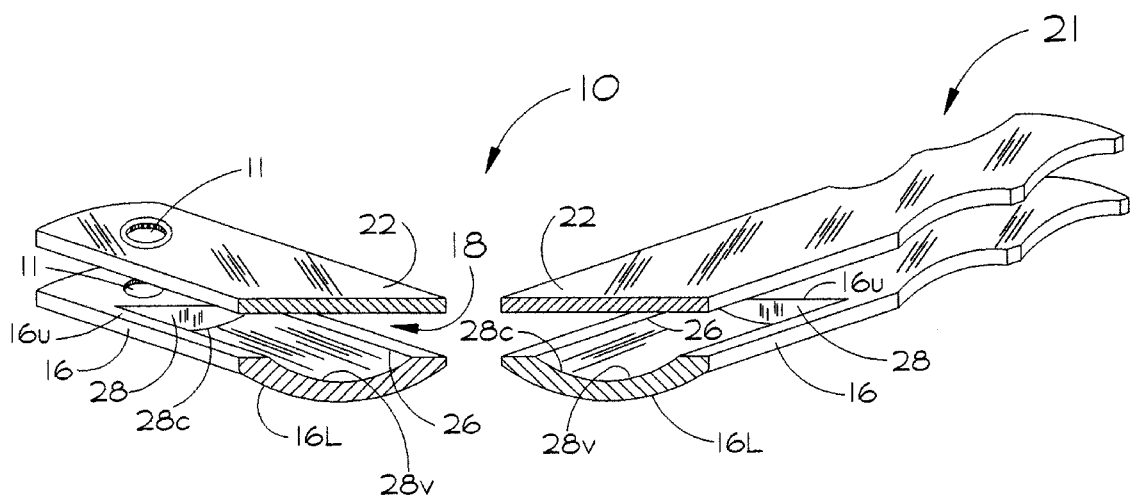
FIG. 27 is an exploded perspective view of a preferred embodiment of a laminated, chambered striker paddle of the present invention.
Figure 28:
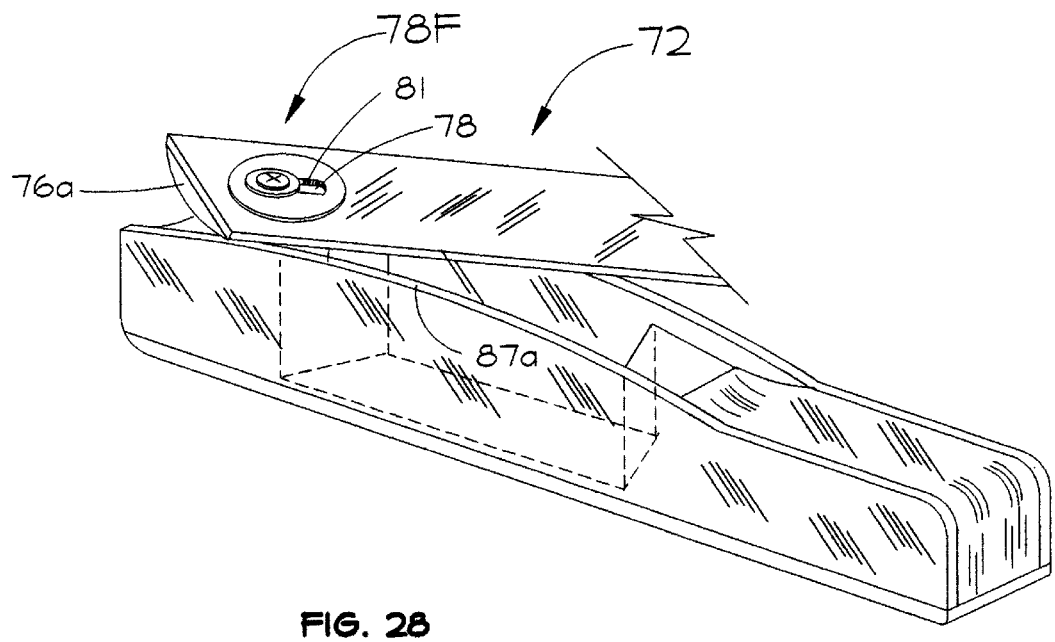
FIG. 28 is a partial side perspective view of a preferred embodiment of the chambered striker paddle turkey call with optionable, pivotable and lockable slide action variable tone selector of the present invention, showing the tone selector in one preferred position, and illustrating by hidden broken lines the open box chamber of the invention.
Figure 29:
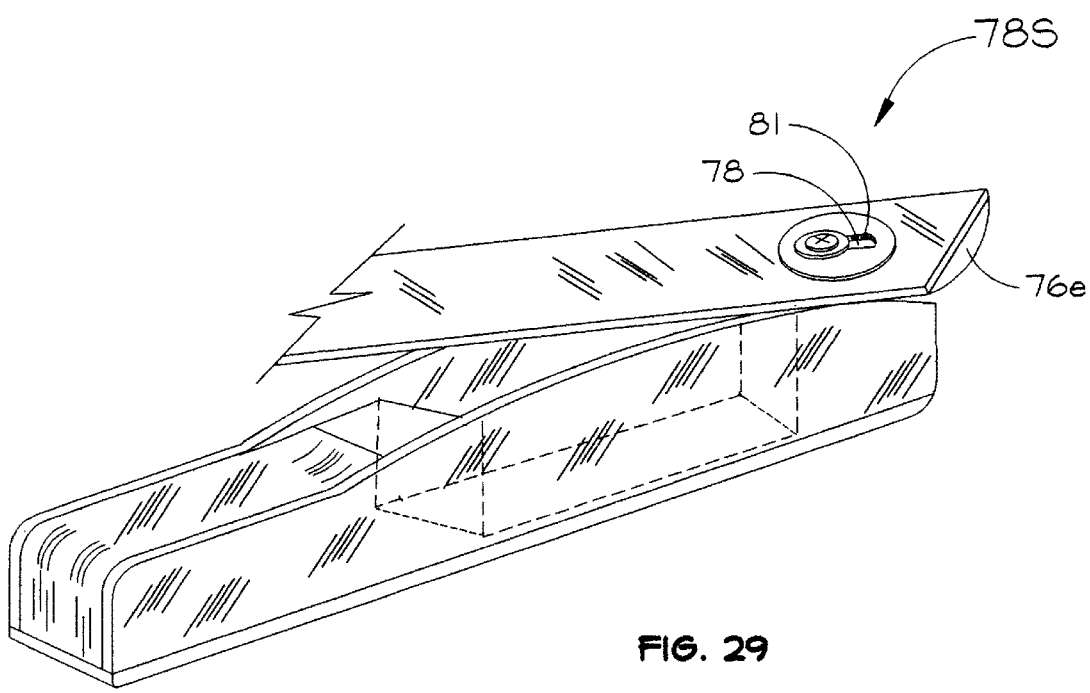
FIG. 29 is a reverse side perspective view from that of FIG. 28, showing the tone selector of the invention in another preferred position.
Figure 30:
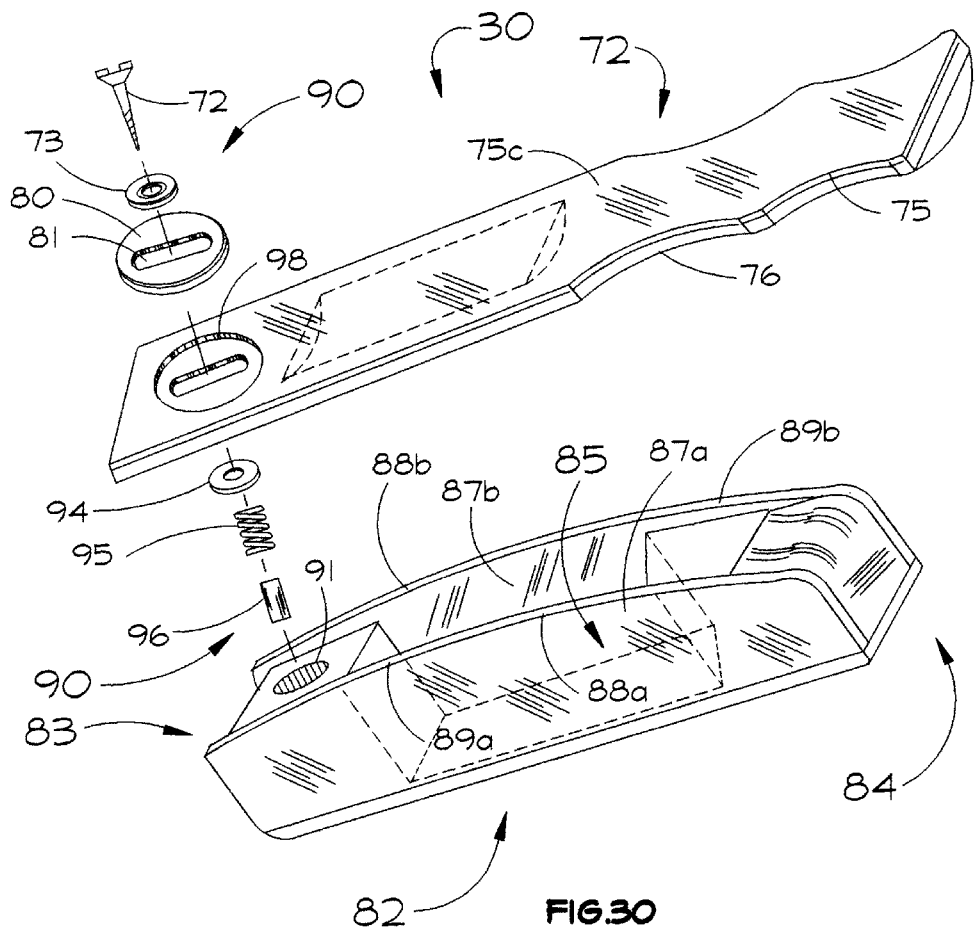
FIG. 30 is a perspective view of another preferred embodiment of the chambered striker paddle wildlife call with optionable, pivotable and lockable slide action variable tone selector of the present invention showing in broken lines the chambering of the striker paddle and open box chamber of the invention.
Figure 31:
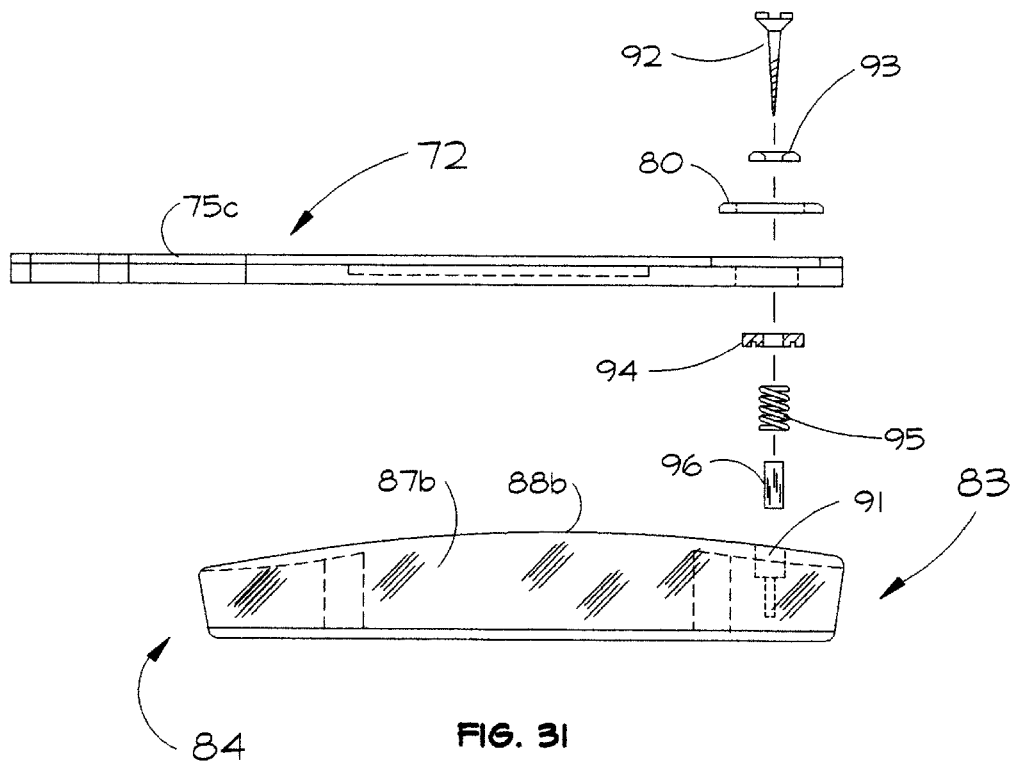
FIG. 31 is a side view of the embodiment of FIG. 30.
Figure 32:
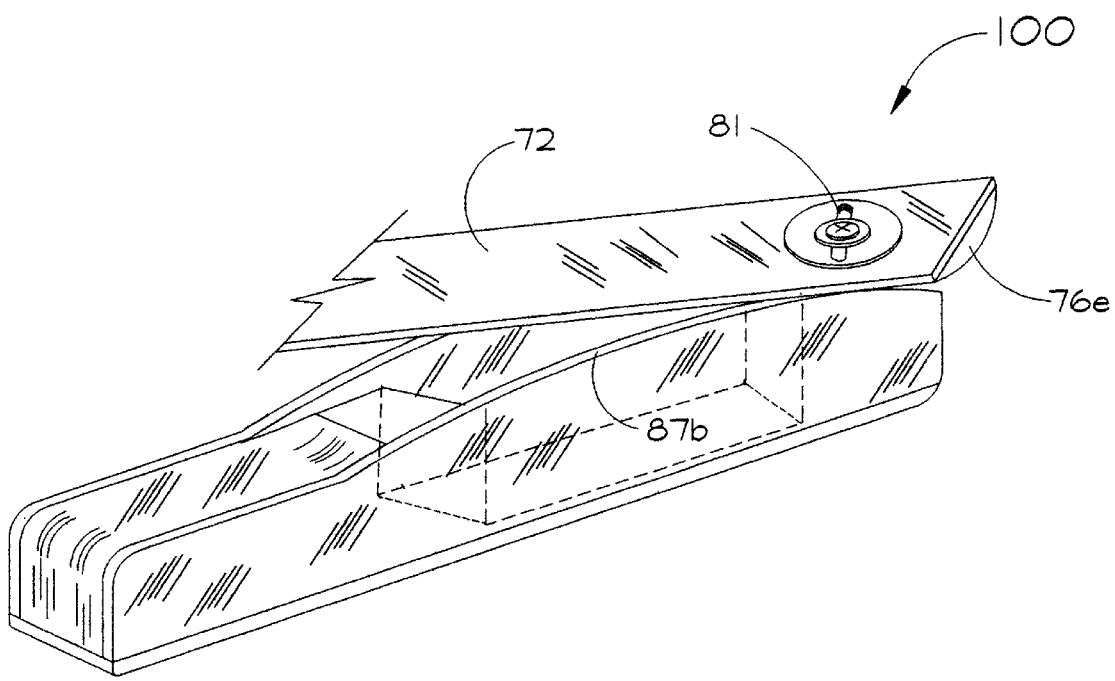
FIG. 32 is a partial perspective view of a preferred embodiment of the chambered striker turkey call with optionable, pivotable and lockable slide action variable tone selector of the invention, illustrated in a locked position, and showing in broken lines the open box chamber of the invention.
Figures 33, 34, 35:
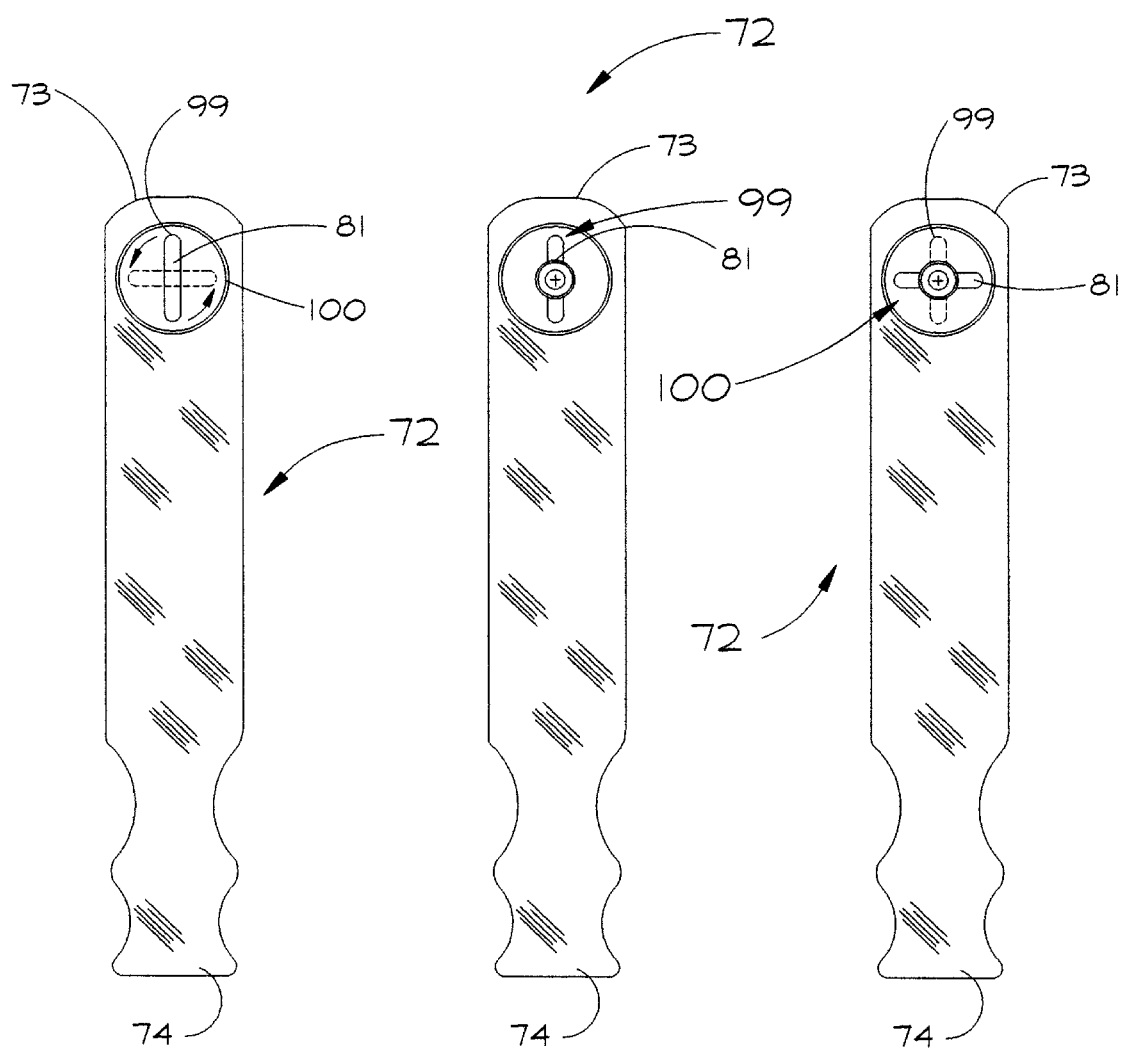
FIG. 33 is a partial top plan view of a preferred embodiment of the striker of the present invention showing a hinge channel and oval member of the opeionable, pivotable and lockable slide action variable tone selector in a slideable position (shown in dark lining), and illustrating a rotated arrow movement of the oval member to positon the hinge channel, shown in broken lines, in a locked position.
FIG. 34 is a top plan view of the striker paddle of the invention showing the pivotable and lockable slide action variable tone selector in a preferred lengthwise/horizontal hinge channel position just prior to rotating the large oval member to place the variable tone selector in a locked position.
FIG. 35 is a similar top plan view to that of FIG. 34, illustrating the next sequenced position of the large oval member of the invention by rotating and placing the hinge channel in a transverse positional relation (shown in dark lining) to the position shown in FIG. 34 (in this figure shown in broken lining), so that the variable tone selector of the invention is illustrated in a preferred locked positon for use of the invention.

The bottom section 16 of the striker in a preferred embodiment of the invention is provided with an external upper surface portion 16u and an external lower surface portion 16L. In the preferred embodiments, illustrated in FIGS. 2, 3, 4, 5, 6, 10, 11 and 12, the sound channel 18 is provided as a part of the front end-portion 17 of the bottom section 16; and is provided in the bottom section 16 preferably in the configuration of an open arcuate channel having the curved or arcuate bottom surface 28c, as indicated, and illustrated in FIGS. 3 and 6. The arcuate surface 28c has, as a part of its curve and configuration, a vertex center arc point 28v; and the upper surface portion 16u is preferably generally flat as illustrated in FIGS. 6 and 27, is generally vertically spaced from the center arc point 28v; and relates and bounds as a perimeter around the sound channel 18, extending from the front end-portion 17 to an area adjacent or proximal to the handle end-portion 21. As illustrated in FIGS. 3, 4, 6, 11, 12 and 27, and other drawings, the arcuate bottom surface 28c is preferably arced to open in a generally positive direction, when the striker 10 is installed, and when it is viewed along an imaginary or constructed axis having an imaginary set of Cartesian coordinate lines. It will, however, be understood that the sound channel 18 of the striker 10 can be provided in many configurations within the scope and spirit of the present invention and can be created or constructed from a plethora of diverse substances and building materials.

With regard to materials used to constuct the striker 10 and the lower box assembly 14, a number of acceptable construction materials include, but are not limited to, wood materials such as cedar, maple, sassafas, chestnut, walnut, cherry, honduras and other types of mahageny, oak, purple heart (South African Wood), fur, pine, and many other diverse types of woods including exotic or specially grown woods; or may include plastic or polymer substances or compounds, various wood, metal or alloy laminates, graphite or other substances or alloy materials.

Figure 13:
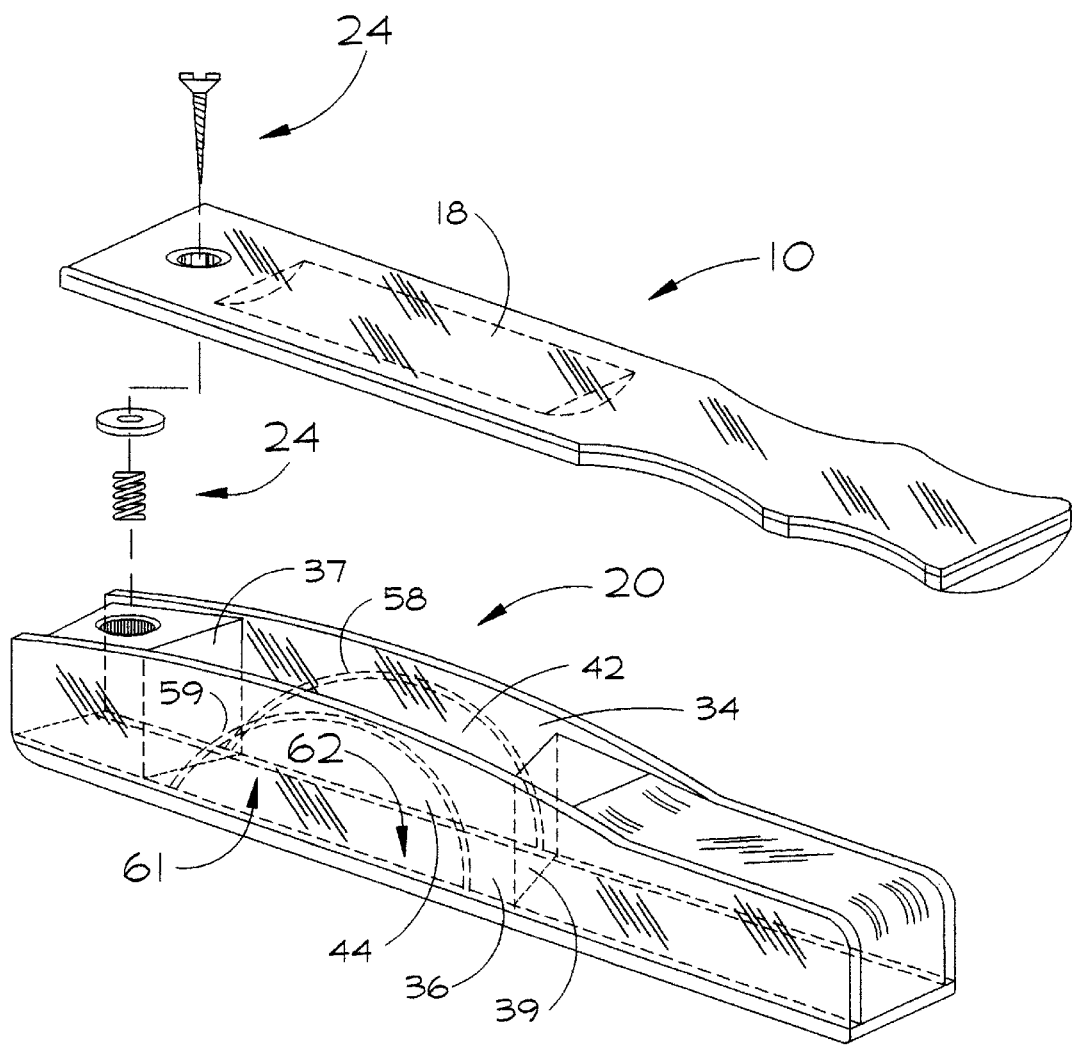
FIG. 13 is a perspective view of a preferred embodiment of the novel chambered striker turkey call with optionable chambered side panels of the present invention.
Figure 14:
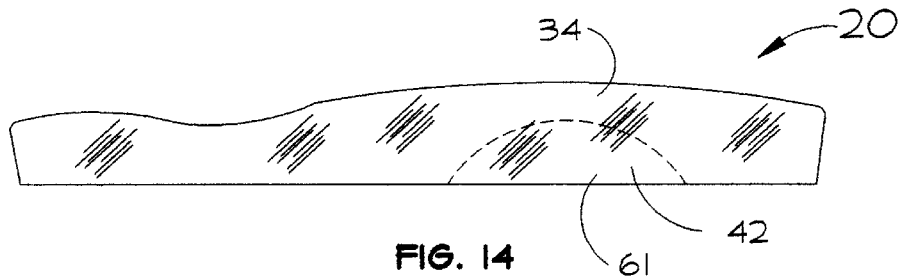
FIG. 14 is a side view of a lower box and handle portion of a preferred embodiment of the present invention showing in hidden broken lines the optionable chambered side panel of the invention.
Figure 15:
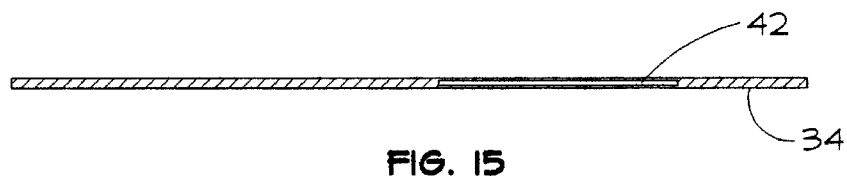
FIG. 15 is a cross-sectional top view of a preferred embodiment of the optionable chamber side panel of the invention.
Figure 16:
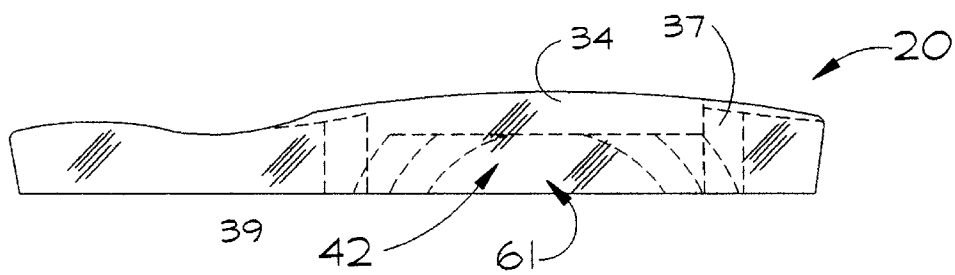
FIG. 16 is a side view of a lower box and handle portion of a preferred embodiment of the invention showing in hidden broken lines an open box-chamber, and in composite broken lines three preferred optionable positional internal chambering for the side panel of the invention.
Figure 17:
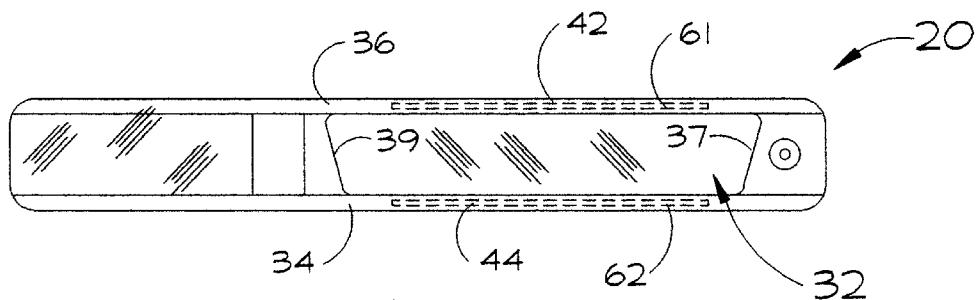
FIG. 17 is a top plan view of a preferred embodiment of the lower box and handle portion of the invention showing in hidden broken lines the optionable chambered side panels of the invention.
Figure 18:
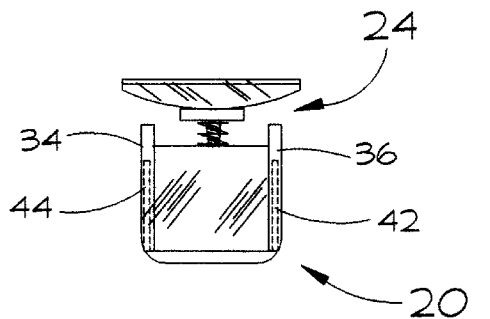
FIG. 18 is a front view of a preferred embodiment showing the optionable chambered side panels of the invention.
Figure 19:
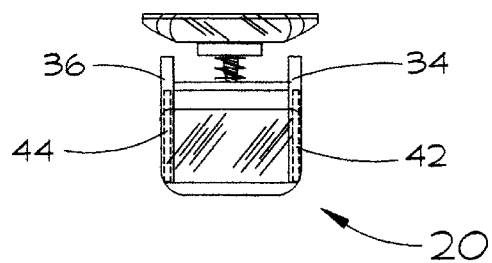
FIG. 19 is a back view of FIG. 18.

Another preferred embodiment of the present invention is illustrated in FIGS. 13 through 19. Together and in combination with the chambered striker paddle member 10, the present invention is provided with a chambered side panel lower box subassembly 20. The friction type box 12 also provided as a part of the chambered side panel lower box subassembly 20 is defined by, and provided as, an open box sound chamber 32 having one pair of long side walls facing or opposing one another, a first long side wall 34 and a second long side wall 36; and having another pair of short side walls facing or opposing one another, a first short side wall 37 and a second short side wall 39. Either one of, or both of, the long side walls, 34 and 36, respectively, are provided with a first closed side chamber 42 and/or a second closed side chamber 44. At least one of the long side walls, 34 and 36, are provided with a closed chamber, either 42 or 44, or both side walls 34, 36 can be provided with the closed side chambers 42,44. Conventional mounting or attachment means 24 can also be utilized in this embodiment of the invention, as illustrated in FIGS. 13, 18 and 19.

As is generally the case with regard to many varieties of box type turkey calls the friction-type box 12 is provided with first and second long side walls, 34 and 36, each having an inside wall 46 and 47, respectively; an outside wall, 48 and 49, respectively; and connected or bounded therebetween at its lengthwise or horizontal open ends by an upper widthways end, 51 and 53, respectively; and at its connected or base horizontal closed end by a lower widthways end, 55 and 57, respectively. Each of the upper widthways ends, 51 and 53, respectively, is provided with a curved, arched, arced, slanted and/or cammed, friction surface, which, in its lengthwise or horizontal length is generally provided, when viewed along an axis formed by an imaginary set of Cartesian coordinate lines, as an arced or curved surface opening in a generally negative direction, though it may be irregular and slanted, toward the bottom or connected base portions of the lower box subassembly 14, as illustrated by examples in FIGS. 1, 2, 3, 4, 13, 14, 16, 18, 19, 20, 21, 22, 23, 24, 26, 28, 29, 30, 31 and 32 of the drawings herein. As will be seen in reviewing the illustrated examples, each of the upper widthways end, 51 and 53, respectively, is inherently provided with an arc-type angle emanating from a chosen point and utilized to generate a curved line or so generally oriented configuration.

In preferred embodiments of the invention each of the closed side chambers, 42 and 44, respectively, is provided with an upper arcuate portion 58 and 59, respectively; and a lower flat portion 61 and 62, respectively. Each upper arcuate portion, 58,59, is inherently provided having an arc-type angle which is greater in angle or magnatude of degrees or radians than that which is inherently part of each respective upper widthways ends, 51,53; and opens, as does the widthways end, 51,53, in a generally negative direction when viewed along an imaginary axis formed by a set of Cartesian coordinate lines.

In another preferred embodiment of the present invention, a chambered striker turkey call with options, 30, with optionable, pivotable and lockable slide action variable tone selector, is presented, as illustrated by example in several embodiments shown in FIGS. 20 through 35 of the drawings herein. The turkey call with options 30 is illustrated in FIGS. 20 and 21, having a specially adapted variable tone striker member subassembly 72, provided with a first end-portion 73, a second end-portion 74, and a top paddle section 75 and a bottom paddle section 76 secured to each other. The first end-portion is provided with an internally spaced and covered sound chamber channel 18, as discussed earlier herein in its embodiments.

The first end-portion 73 of the striker member subassembly 72 is provided with an elongated pivot hinge channel 78. The striker subassembly 72 is further provided with an upper hinge support member 80 having an inner channel 81 within it. The inner channel 81 is designed to have a perimeter very close to, or the same as, that of the elongated pivot hinge channel 78.

The turkey call 30 of this preferred embodiment is provided with a lower box subassembly 82; and is illustrated in FIGS. 20 and 21 having a first end 83 and a second end 84. The box subassembly 82 is further provided with a open sound chamber 85 having a first pair of opposing side walls 86a and 86b and a second pair of opposing side walls 87a and 87b. Each of the second pair of opposing side walls 87a and 87b is provided with an upper widthwise surface 88a and 88b, respectively. Each of the widthwise surfaces, 88a and 88b are provided with a range of points of accessible and frictionable contact, and also define along its horizontal axis a center or middle portion strike point, 89a and 89b, respectively. The strike point, 89a,89b, is the most favored middle area or point along the horizontal axis and points of accessible, frictionable contact of each of the widthwise surfaces, 88a, 88b, where sound production and vibration moves outward therefrom to generate the clearest or best sound from the open sound chamber 85 and the box subassembly 82; it is a "0-point" ("zero point") which acts as the center of friction, i.e., the center or starting point of vibration, to an outward point or direction to create sound and tone from the box subassembly 82 and the interfacing variable tone striker member subassembly 72.

The first end-portion 83 of the box subassembly 82 is provided with a hinge coupling cylinder-like space 91 for providing a point and means for attachment and coupling of the variable tone striker member subassembly 72.

The turkey call 30 is also provided with a specially adapted and novel coupling hinge means subassembly 90 which is utilized in the present invention to couple and attach the striker subassembly 72 in a manner which allows it to be capable of pivoting and tilting movement along diverse axes and sliding movement on generally horizontal axis as the striker subassembly 72 moves along the elongated pivot hinge channel 78 defined within or as a part of itself. Within one general, broader scope of the spirit of the invention, the coupling hinge means subassembly is designed to extend through and retain with operative striker 72 movement as indicated and illustrated, the inner channel 81 of the upper hinge support member 80, the elongated pivot hinge channel 78 and the hinge coupling cylinder-like space 91. And by being retained and coupled in this moveable manner the bottom paddle section 76 of the striker subassembly 72 can make, through preselected and chosen or optionable movement intention on the part of the user, friction-like contact for a duration of time with either one of the widthwise surfaces 88a, 88b, of either of the second pair of opposing side walls, 87a, 87b; respectively. In so doing, contact can be made along the respective widthwise surfaces, 88a or 88b, at preferred and variable location thereon along the range of points of accessible contact and in reference and relation to the respective middle portion strike points, 89a or 89b, on the widthwise surfaces, 88a, 88b.

In a preferred embodiment the top paddle section 75 and the bottom paddle section 76 of the striker subassembly 72 are, each, provided as laminate panel sections and are laminated, attached and secured to one another in this embodiment. It will also be understood in this regard that the striker 72 can be provided with top and bottom paddle sections, 75 and 76, together or integral in construction, or as a molded and chambered member.

Additionally, the bottom paddle section 76 is provided, in a preferred embodiment of the invention, with the top paddle section 75 having a generally or completely flatened external surface 75e and the bottom paddle section 76 having a generally curved or completely arcuate surface 76e, as illustrated in FIG. 20; each, extending from the first end-portion 73 to the second end-portion 74 of the striker meber subassembly 72. Additionally as similarly described and disclosed in other embodiment discussed herein; and, similar, as illustrated in FIGS. 3, 4, 6 and 27; the bottom section 76 of the striker subassembly 72 is provided in preferred embodiments with a sound chamber channel 18 having the configuration of an arcuate or curved channel, although other shapes are utilizable; and, preferably, a curved or arcuate bottom surface 28*c* which is provided with a vertex center arc point 28*v*; with the arcuate bottom surface 28*c* being preferably arced or curved to open in a generally positive direction, when the striker subassembly 72 is installed and the turkey call 30 is in a generally upright position as illustrated, when viewed along an imaginary axis formed by an imaginary set of Cartesian coordinate lines interfacing or intersecting the bottom surface 28*c*. In this preferred manner and embodiment the surface 28*c* is designed to be generally congruent or similar to the curve or configuration of the arcuate surface 76*e* of the bottom paddle section 76. However, the channel 18 can have different shapes and configurations, as can the surface 76*e*, which are either the same, similar to or different from each other or in relation to each other.

In a preferred embodiment of the chambered striker turkey call with options 30 of the invention, the coupling hinge means subassembly 90 is provided with a pin securement and coupling member 92, an upper washer member 93 and a lower washer member 94 (each with center axial space portions), a spring-oriented biasing member 95 (having a center axial space portion), and a collar member 96 (also having a center-oriented axial space portion), as illustrated in various embodiments in FIGS. 20, 21, 24, 25, 26, 30 and 31; each of which can be constructed of hard, resilient or flexible substances and materials.

The upper hinge support member 80, in its various preferred embodiments illustrated in the above recited drawings, is positioned and aligned for coupling and attachment of the coupling hinge subassembly 90, over or above the first end-portion 72 and the top paddle section 75 of the striker subassembly 72 (when the turkey call 30 is in an upright position, as illustrated). In so doing, the upper hinge support member 80 is positioned so that its inner channel 81 is substantially, congruently positioned and aligned over the elongated pivot hinge channel 78 of the first end-portion 73 of the striker subassembly 72. The upper washer 93 is positioned and aligned for coupling over the upper hinge support member 80. In so doing, the center axial space portion of the upper washer member 93, the inner channel 81 of the upper hinge support member 80 and the elongated pivot hinge channel 78 of the first end-portion 73 of the striker subassembly 72; are each positioned for alignment with each other.

Additionally, the lower washer member 94 is positioned and aligned for coupling under the upper hinge support member 80 so that the center axial space portion of the washer 94 is aligned in relevant part to a portion of the elongated pivot hinge channel 78 of the striker subassembly 72. The biasing member 95 and the collar member 96 are positioned and aligned for coupling and moveable attachment, as indicated and illustrated, under the lower washer member 94. In this positioning for coupling the collar member 96 is placed generally concentrically and/or axially within the center axial space portion of the biasing member 95. In this part of the positional orientation for coupling, then, the elongated pivot hinge channel 78, the lower washer member 94, the collar member 96 and the biasing member 95 are placed in substantial alignment with one another for coupling and attachment.

The pin securement and coupling member 92 is, then, inserted, by such order of interfacing contact, through the upper washer member 93, the inner channel 81 of the upper hinge support member 80, the elongated pivot hinge channel of the striker subassembly 72, the lower washer member 94, and the collar member 96 and the biasing member 95 together as positioned; each, as positioned and aligned for moveable coupling and attachment. The pin member 92, upon such inserted interface, is brought to be attached and coupled within the hinge coupling space 91 of the lower box subassembly 82 of the turkey call 30. This can be accomplished by many diverse means of attachment or securement, including, but not limited to, threadable securement, punctured, nailed or tapped securement, integral, sectioned or other diverse types of releasible/non-releasible, adjustable or non-adjustable attachment, coupling or interface. It is, however, preferred, by example, to provide the pin 92 and the coupling space 91 in relation to one another so that the pin 92 can be adjusted as to position, height and/or pressure or torque, in relation to the coupling space 91 and each of the members, items, channels or parts coupled, or through which the pin 92 is inserted.

When coupling and attachment is affected as indicated above with regard to preferred embodiments of the turkey call with options 30; the striker subassembly 72 is coupled so as to be in a condition to be slideable, pivotable and otherwise moveable along a diverse plurality of axes in relation to the lower box subassembly 82. In so doing, optionable points and portions of the curved or arcuate surface 76*e* of the bottom paddle section 75 of the striker subassembly 72 can be brought to make friction-like contact with a preferred or preselected choice of the range of points of accessible contact provided along each of the widthwise surfaces, 88*a* and/or 88*b*; and also such points and portions of the striker subassembly 72 can be moved, positioned and interfaced in relation to each of the respective strike points, 89*a* and/or 89*b*, for utilization in varying sound, tone, amplification, resonance and/or pitch or other sound qualities generated by use of the turkey call 30. In this regard, examples of a first slideable position 78F and a second slideable position 78S, are shown illustrated, respectively, in FIGS. 28 and 29.

Figure 22:
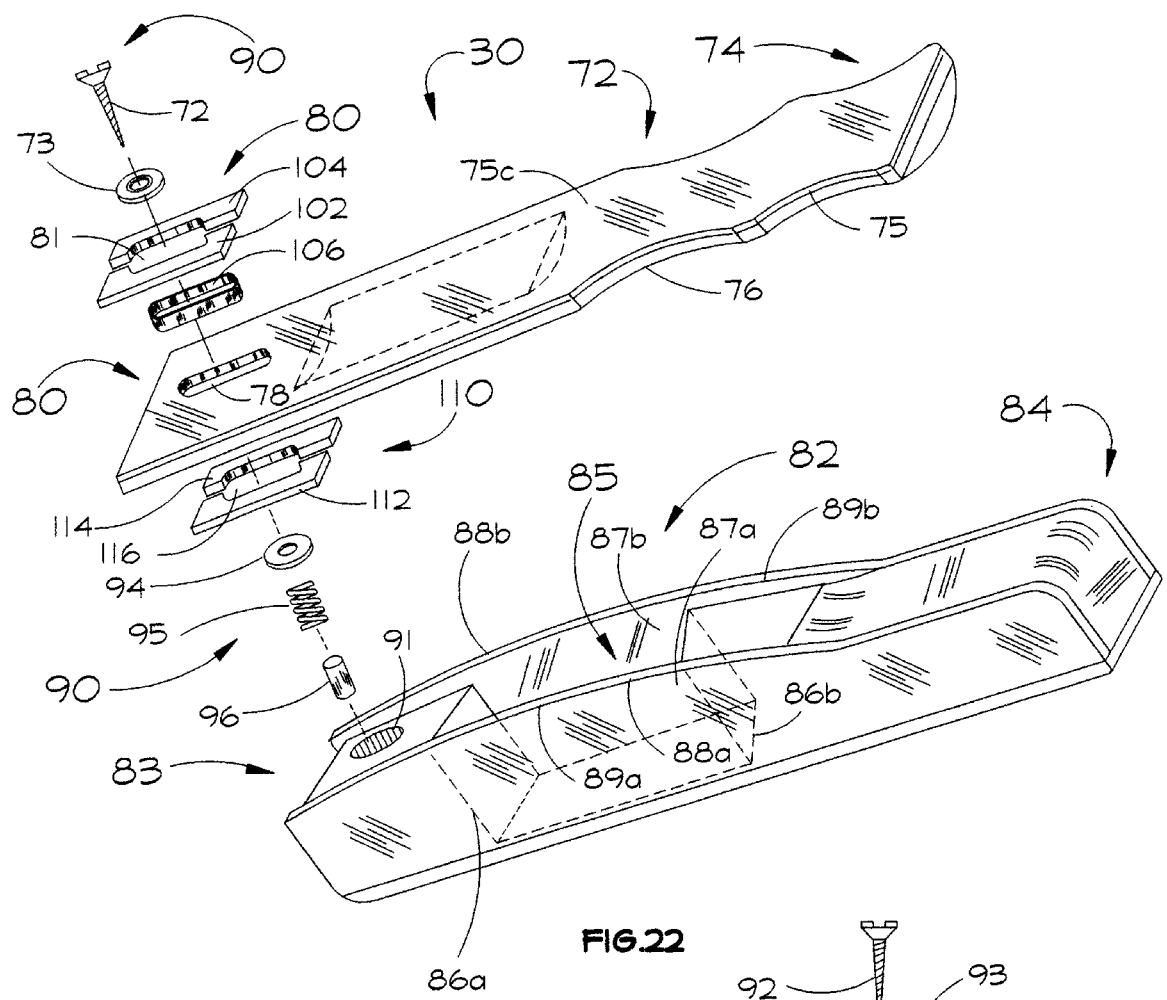
FIG. 22 is another preferred embodiment of the chambered striker turkey call with pivotable slide action variable tone selector, showing in hidden broken lines the chambering in the striker paddle and open box chamber, of the invention.
Figure 23:
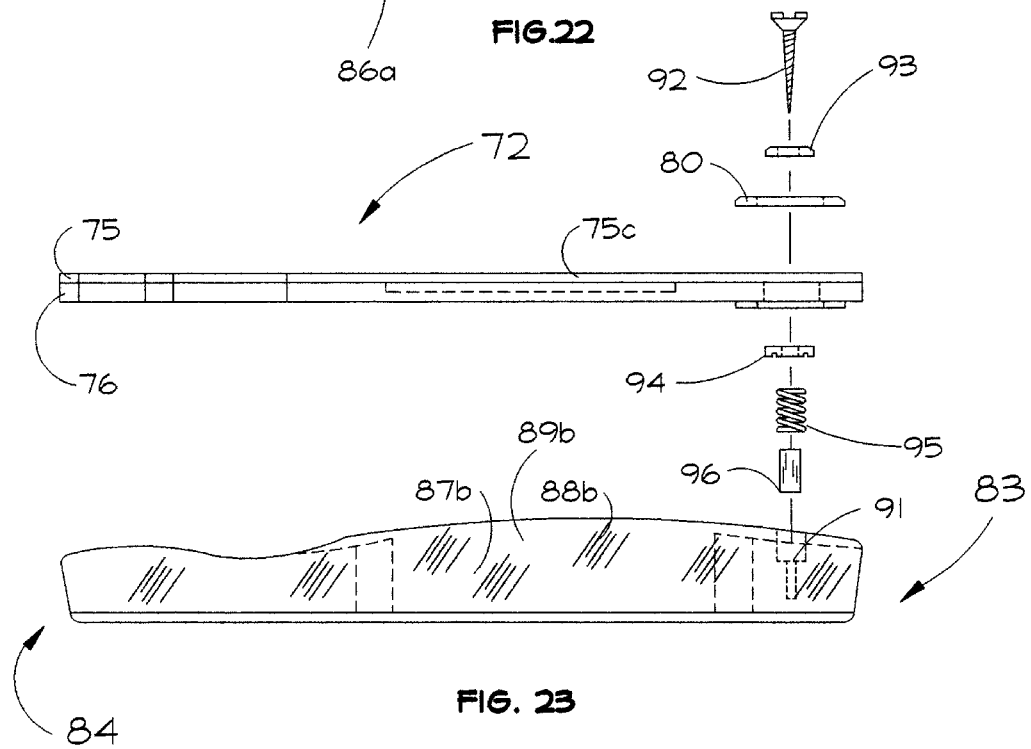
FIG. 23 is a side view of the preferred embodiment of FIG. 22.
Figure 24:
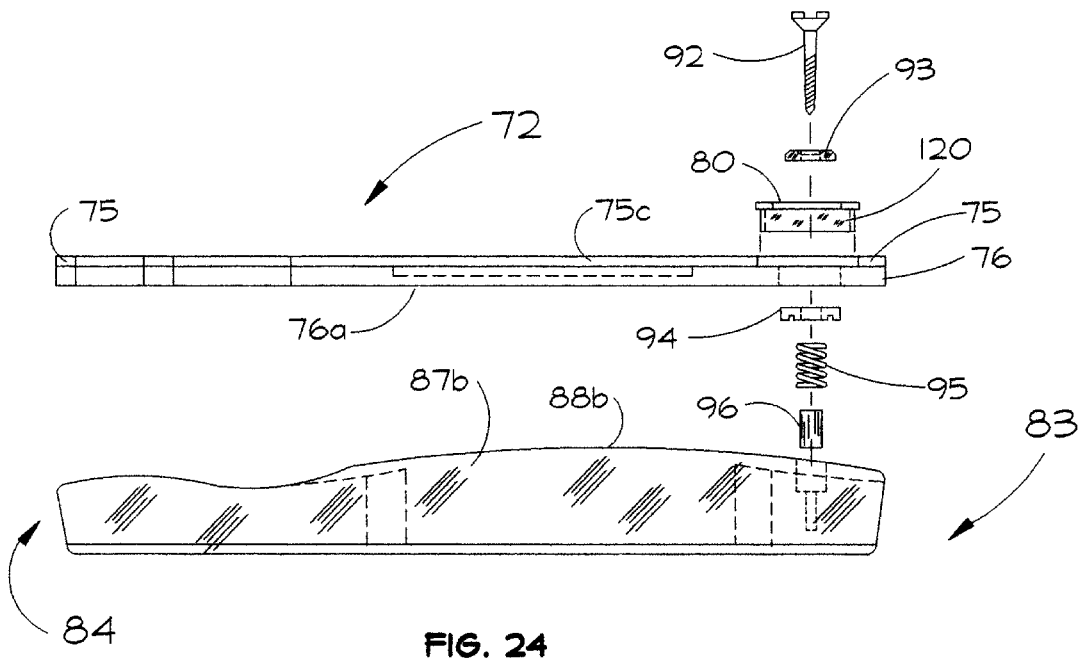
FIG. 24 is a side view of another preferred embodiment of the chambered striker turkey call with the optionable pivotable slide action variable tone selector of the invention showing in hidden broken lines the chambering of the striker paddle and the open box chamber of the invention.

As will be seen in the various drawing illustrations herein showing by example the various design configurations in which the upper hinge support member 80 of the striker subassembly 72 can be provided within the scope and spirit of the invention; the upper hinge support member 80 can be provided with a circular or elliptical outer perimeter configuration (ex. FIGS. 20, 25, 26, 28, 30), a square or rectangular configuration (ex. FIGS. 22 and 23), or in a diverse variety of other outer configurations. Additionally, the inner channel 81 of the support member 80 can also be provided in a number of configurational dimensions and positional orientations which would generally correlate with that of the elongated pivot hinge channel 78, and, together, capacitate or contribute to allowing the striker subassembly 72 to be moved, while attached to the lower box subassembly 82, in multi-axis relation to the subassembly 82.

Figure 26:
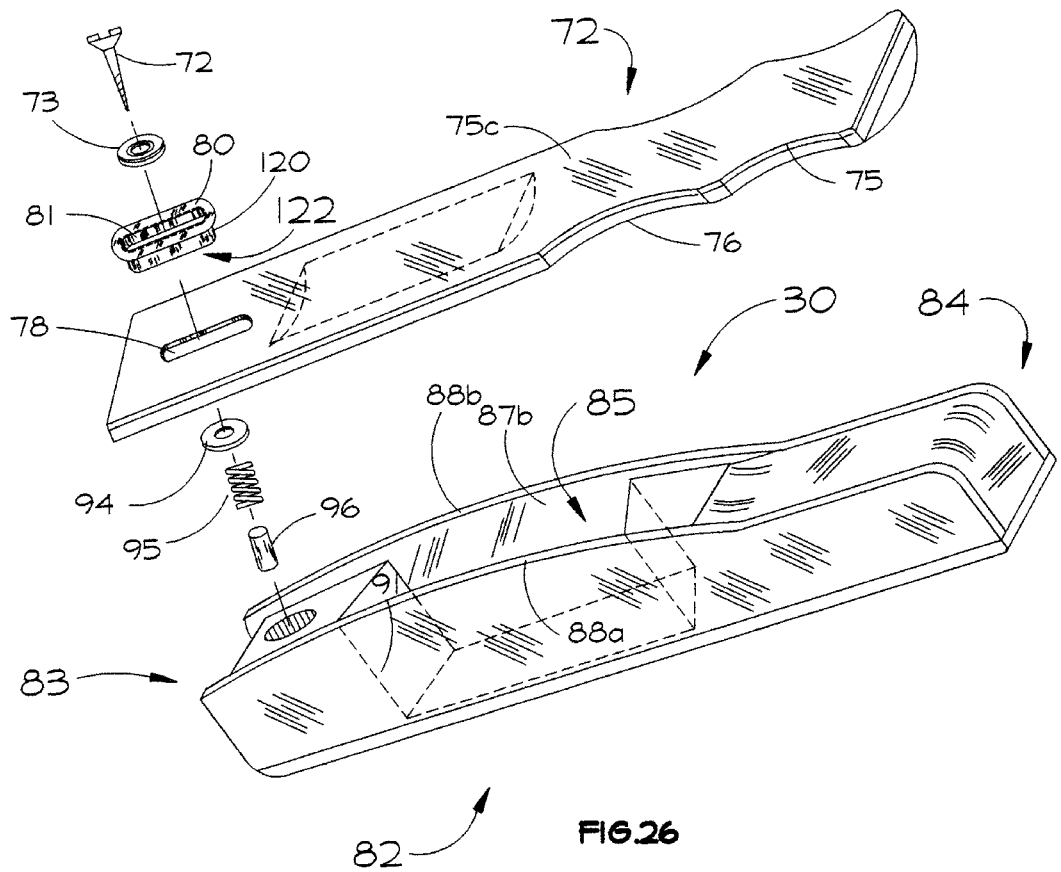
FIG. 26 is another preferred embodiment of the chambered striker turkey call with pivotable slide action variable tone selector of the invention, showing in hidden broken lines the chambering inside the striker paddle and the open box chamber of the invention.

In this regard, it will be understood that the pivot hinge channel 78 can be utilized with or without the support member 80 (which, when preferably used has a similarly shaped inner channel 81), and can be shaped as illustrated in FIGS. 20, 22 or 26; or otherwise shaped or channeled to facilitate lengthwise (horizontal), vertical, slanted, diagonal and/or tilted pivotal movement of the bottom paddle section 76 of the striker 72 in relation to the widthwise respective surfaces, 88*a*, 88*b*, and the respective strike points 89*a*, 89*b*, thereon. In this manner different portions of the sound chamber channel 18 of the striker subassembly 72 as well as other portions of the first end-portion 73 and the second end-portion 74 of the subassembly 72, including the arcuate surface 76*e*, are positionable and pivotable in relation to the surfaces 88*a*, 88*b*, and the strike points 89*a,* 89*b*. While in preferred embodiment examples of the configuration or channeling of the elongated pivot hinge channel 78 of the striker subassembly 72 have been illustrated as being generally narrow and generally elongated elliptically along a lengthwise or horizontal axis, it will be understood that a number of channel configurations can be utilized within the spirit of the present invention to affect the use and purpose intended of defining diversified movement and positioning of the striker subassembly 72, and external and internal portions thereof, in relation to the widthwise surfaces 88*a*, 88*b*, and the opposing side walls 87*a*, 87*b*.

Additionally, in a preferred embodiment the first end-portion 73, which will include portions of the top paddle section 75 and may include portions of the bottom paddle section 76, is provided with a support channel 98 for contact and interface of the upper hinge support member 80 which will allow movement, rotation and release of the hinge support member 80 when it is secured in coupled position by the coupling hinge means subassembly 90. In this preferred embodiment the elongated pivot hinge channel 78 is substantially formed and defined from the bottom paddle section 76 of the first end-portion 73 of the striker subassembly 72. In this preferred embodiment, therefore, the upper hinge support member 80 is utilizable by rotating the support member 80 so that its inner channel 81 is positionally changed, as illustrated by example in FIGS. 28, 29, 32, 33, 34 and 35, from a first position 99 where its perimeter is positionally oriented to be elongated along a lengthwise, horizontal axis of the flat surface 75*e* of the striker subassembly 72; to a second or locked position 100 where its perimeter is positionally oriented to be elongated along an angel or axis transverse or perpendicular to its orientation in the first position 99. In so doing the striker subassembly 72 is locked in position along its elongated pivot hinge channel 78 by the transversely positioned and coupled inner channel 81 of the coupled upper hinge support member 80. Additionally, in so doing, this will inable the turkey call 30 and striker subassembly 72 to be calibrated or designed so that when the striker 72 is locked in a second or further position 100 the center, or a preferred portion, of the sound chamber channel 18 and/or the bottom section 76 or arcuate surface 76*e* can be positioned in a preferred relation to the strike points, 89*a* or 89*b,* and other portions along the widthwise surfaces, 88*a* or 88*b,* of either of the second pair of opposing side walls 87*a* or 87*b,* respectively; to lock in a preferred or enhanced sound coming from the turkey call 30, or to take advantage of idiosyncratic or special construction or sound characteristics of a particular turkey call 30, or particular or specially adapted wood or other types of materials used to construct the turkey call 30.

Figure 25:
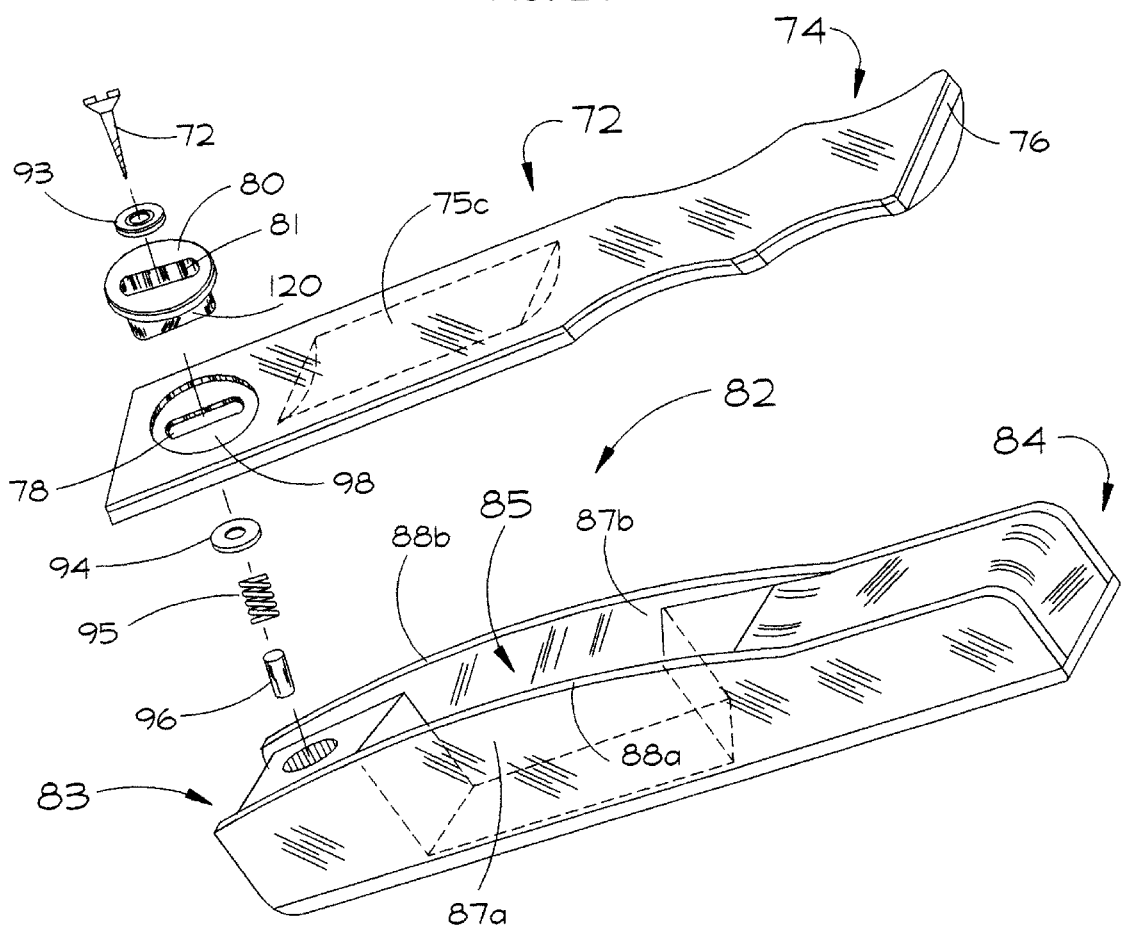
FIG. 25 is an enlarged scale perspective view of the embodiment of FIG. 24.

Additionally, as earlier discussed in part the upper hinge support member 80 can be provided having many different outer configurations to advantagously utilize or capacitate moving the inner channel 81 to a transverse orientation or position; but in preferred embodiments this feature of the invention is illustrated as being enhanced by providing the hinge support member 80 having a substantially circular outer configuration, as illustrated in FIGS. 20, 21, 28, 29, 30, 31, 32, 33, 34 and 35; an elliptically oriented outer configuration, as illustrated in FIG. 26; and a circular and elliptical configurational orientation, as illustrated in FIGS. 23 and 25. Also, portions of the support member 80, the pin 92, the upper washer 93, the lower washer 94, the biasing member 95 and/or the collar member 96 can be counter sunk or surfaced, beveled, sloped, angled, notched and/or chamfered, or otherwise adapted, to facilitate the spirit, and structure and function, of the invention.

In one locked position, the first and second end-portions 73 and 74 of the striker subassembly 72 are positioned closely adjacent or proximal respectively to the first and second ends 83 and 84 of the lower box subassembly 82 while also, at the same time, positioning the center portion of the sound chamber channel 18 of the striker 72 adjacent or proximal to either of the strike points 89*a* or 89*b* of the widthwise surfaces, 88*a,* 88*b*. However, it will be understood by those skilled in the art that many other locked positional orientations, adjacent interfaces and other adjustments or calibration are possible in utilizing the locking feature of the support member 80.

In another preferred embodiment of the invention, illustrated by example in FIGS. 22 and 23, the striker subassembly 72 is provided with an upper hinge support member 80 having a left half corner portion 102 and a right half corner portion 104 which creates or defines the inner channel 81 between the corner portions 102 and 104. Additionally, in this embodiment the elongated pivot hinge channel 78 of the striker subassembly 72 is provided with an internally, perimeter-inserted, pivot hinge channel seating collar 106, which is slideably interfaced and inserted within, or integrally provided as a part of, the elongated pivot hinge channel 78. In this preferred embodiment the striker subassembly is also provided with a lower hinge support member 110 which can be provided in a square or rectangular outer configuration as illustrated in FIGS. 22 and 23, a circular or elliptical outer configuration as illustrated with respect to the upper hinge support member 80 in FIGS. 20, 21, 24, 25, 26, 30 and 31; or can have an outer configuration taking other shapes and forms structurally. The lower hinge support member 110 is preferably provided with a left bottom corner portion 112 and a right bottom corner portion 114 and their juxtaposition, as with the half corner portions 102 and 104 of the upper hinge support member 80, provides or creates a lower inner channel 116 which is generally or substantially congruent in perimeter to that of the elongated pivot hinge channel 78 of the striker subassembly 72. As in the case of the upper hinge support member 80 and the half corner portions 102 and 104, it will be understood that the lower hinge support member 110 can be provided in many forms and configurations and that the bottom corner portions 114 and/or 116 can be provided integrally together or in greater number of portions or elements and having different configurations, forms and structure within the spirit of the invention.

The lower hinge support member 110 is fixed and attached to the bottom section 76 and the first end-portion 73 of the striker subassembly 72 so that the lower inner channel 116 is in alignment with the elongated pivot hinge channel 78 of the striker 72. In this embodiment the pin coupling member of the coupling hinge means subassembly 90 extends down through the lower inner channel 116 of the lower hinge support member 110, when it is mounted on the bottom section 76 of the striker 72 under the pivot hinge channel 78; before, then, encountering the lower washer member 94 of the coupling subassembly 90.

In another preferred embodiment the upper hinge support member 80 is further provided with a flange collar member 120 which is integrally a part or otherwise fixed or attached adjacent to and extending from the general perimeter area of the inner channel 81 of the upper hinge support member 80; and which, itself, is provided with a flange channel 122 which has an inner perimeter substantially in alignment and congruent with the elongated pivot hinge channel 78 when coupled, or provided with a perimeter which will insert down into and interface with the elongated pivot hinge channel 78 of the striker 72, through which the pin member will pass when being inserted in this embodiment to couple with hinge coupling space 91, as illustrated generally in FIGS. 25 and 26, by example.

Additionally, in preferred embodiments of the present invention illustrated by example throughout the drawings, in FIGS. 1, 2, 13, 16, 17, 20, 21, 22, 23, 25, 26, 28, 29, 30, 31 and 32; the lower box subassembly 82 is preferably provided with an open sound chamber 85 having a generally trapazoidal or rectangular configuration when viewed from the top or perspectively. It is understood, however, by those skilled that such sound chambers have been provided in many configurations and side-wall shapes since the late nineteenth century; and, hence, in the present invention the improvments and novel elements taught can be used in combination with many different sound chamber configurations and many diverse types of box-type turkey and wildlife calls.

In another preferred embodiment of the present invention, however, when so viewed, is provided in a trapezoid-like configuration where the first pair of opposing side walls 86a and 86b represent in configuration orientation the short sides of a trapezoid shape, and the second pair of opposing side walls of the open sound chamber 85 represent the long sides of a trapezoid shape.

Additionally, in preferred embodiments where the variable tone striker subassembly 72 is utilized either of the second pair of opposing side walls 87a and/or 87b, is provided with a first and/or second closed side chamber 42 and/or 44 as discussed and disclosed earlier herein, as shown by general examples in FIGS. 13 and 19.

While the present invention has been described in connection with the particular embodiments thereof, it will be understood that many changes and modifications of this invention may be made by those skilled in the art without departing from the true spirit, concepts and scope of the present invention.

Some of these modifications, among many others, falling within the scope and spirit of the present invention, relate to dimensions and size of various elements of the invention. For example, in laminated embodiments of the invention, the top section 22 of the preferred chambered striker paddle member 10, and the top paddle section 75 of the variable tone striker member subassembly 72, are each preferrably provided in a range of thickness of from about 1 mm. to about 2.5 mm.

Additionally, in this regard, it will be appreciated that the configuration and dimensions of the sound chamber channel 18, and its spatial and dimensional relationship to the surfaces of the chambered striker paddle member 10, and with the variable tone striker member subassembly 30, themselves, of which it is a part, can vary considerably; as illustrated, in part by example, in FIGS. 5, 6, 7, 8, 9, 10, 13 and 27. Further, in this regard, examples of preferable length dimensions for the sound chamber channel 18 include, but are not limited to 2½, 3 and 4 inches, respectively. Therefore, the respective top section 22 and the top paddle section 75 form a dimension relationship, respectively, with the length dimensions for the sound chamber 18, which is mathematically elucidated by the ratio of from about 1:25.4 to about 1:101.6; and is also illustrated in FIGS. 1, 2, 5, 7 through 10, 13, 20 through 26, 30 and 31. Additionally, regarding this, it will be understood that the dimensional and spacial relationship of the front end-portion 17 to the handle end-portion 21 of the paddle member 10; and of the first end-portion 73 to the second end-portion 74 of the striker member subassembly 72; can vary considerably within the scope of the invention. Additionally, the spatial, configurational and dimensional relationship of the chambered striker paddle member 10 with the lower box subassembly of a turkey box 14 with which it interacts and is utilized in combination with and of the striker member subassembly 72 with the lower box subassembly 82 can vary substantially, while remaining within the spirit of the invention. It will also be appreciated that when the sound chamber channel 18 is created or defined by laminated sections, parts or elements, or where the novel coupling means 90 of the present invention is utilized, that small openings communicating from outside surfaces of the stiker paddle member 10 or the variable control striker member subassembly 72 may be inherent in such types of constuction.

Additionally, in preferred embodiments of the invention, preferred dimensions (although many dimensions and shape configurations are utilizable as indicated) of the open box sound chamber 32 and the open sound chamber 85 (of the lower box subassembly 82); include or define a trapezoid-like shaped box (when viewed vertically from the top) provided, respectively, with a first long side wall 34, and with one of the second pair of opposing side walls (87a or 87b), having a length dimension of from about 4⅜ to about 4½ inches; the second long side wall 36, and the other of the opposing side walls (87a or 87b), having a length dimension of from about 4¾ to about 5 inches; and with the shorter, width sides of the preferred trapezoidal shape (first and second short side walls 37 and 39; and the first pair of opposing side walls 86a and 86b) each having a length dimension of about 1⅛ inches.

Additionally in preferred embodiments, the first and second closed side chambers 42 and 44 are provided with lower flat portions 61 and 62, respectively, proportional or equal in length to the length of the sound chamber channel 18, and can also be provided having a height dimension between the lower flat portions (61 and 62) and the upper arcuate portions (58 and 59) of from about 17 mm. to about 23.3 mm., or of about ⅝ in.; with corresponding lengths of the lower flat portions 61,62 of side chambers 42, 44, varying in these embodiments of from about 103 to about 105 mm. Many other spatial and configurational dimensions of the lower box subassembly of a turkey box call 14, or the lower box subassembly 82, are utilizable in the present invention.

Accordingly, the appended claims are intended to cover all such changes and modifications as falling within the true scope and spirit of the present invention. The reader is requested to determine the scope of the invention by the appended claims and their legal equivalents, and not by the examples which have been given.

Having described my invention, I claim:

1. A striker member for interacting with a frictionable box of a turkey box call having opposing side walls, each having an exposed longitudinally oriented curved surface for frictionable contact, and a front end having a hinge coupling space, said striker member comprising:

a first end-portion and a second end-portion, each with elongate and widthwise axes and perimeters, said first end-portion having a closed bottom section and a closed top section, defining inside and internally spaced therewithin a self-contained and self-enclosed sound chamber channel, and said second end-portion defining a solid handle means for holding; and channeled, pivotable and slideable attachment means mounted along, and self-contained within, the first end-portion of said striker for being moveably and slideably coupled as a self-contained unit to a hinge coupling space of a front end of a frictionable box of a turkey box call, for so mounting said striker.

2. The striker member of claim 1, wherein:

the self-contained and self-enclosed sound chamber channel of said first end-portion of said striker comprises a first portion extending along the elongate axis, an adjacent second portion extending along the widthwise axis, and an arcuate bottom surface.

3. The striker member of claim 1, wherein:

said closed bottom section and said closed top section of said first end-portion are, each, laminated panel sections fixedly secured to one another, said closed top section has a thickness of from about 1 mm. to about 2.5 mm.;

said self-contained and self-enclosed sound chamber channel has an elongate axis length of from about 2.5 in. to about 4 in.;

and wherein:

the dimensional relationship of the thickness of the closed top section to the elongate axis length of the self-contained and self-enclosed sound chamber channel is mathematically elucidated by the ratio of from about 1:25.4 to about 1:101.6.

4. The striker member of claim 3, wherein:

said closed bottom section of said first end-portion comprises a upper surface portion and a lower surface portion, said upper surface portion of the closed bottom section defining an arcuate channel with a lower arced surface and a substantially flat surface portion spaced from the lower arced surface which bounds as a perimeter around the arcuate channel, the lower arced surface opening in a generally positive direction when viewed along an imaginary axis formed by a set of Cartesian coordinate lines, said lower surface portion having a curved surface, said curved surface and said lower arced surface of the arcuate channel being generally congruent to, and spaced, in relation to one another.

5. A chambered striker wildlife call assembly, comprising:

a striker member subassembly having a first end portion and a second end-portion, the first end-portion defining a closed internal chamber and the second end-portion defining handle means for moving said striker member subassembly;

a lower box member subassembly, said box member subassembly defining an open sound chamber having a first pair of opposing side walls and a second pair of opposing side walls, at least one of the first pair of opposing side walls defining a closed chamber; and attachment means mounted on the striker member subassembly and the lower box member subassembly, for moveably supporting said striker member subassembly vertically adjacent to said lower box member subassembly; and wherein:

each of said first pair of opposing side walls comprises inside and outside walls, bounded therebetween by upper and lower widthways ends, the upper widthways end defining a generally arced surface having an arc angle, and opening in a generally negative direction when viewed along an imaginary axis formed by a set of Cartesian coordinate lines, the closed chamber of the side wall having an upper arcuate portion and a lower flat portion, the upper arcuate portion having an arc angle greater than the arc angle of the upper widthways end of said side wall, and opening in the same direction as the arced surface of the upper widthways end.

6. The chambered striker wildlife call assembly of claim 5, wherein:

said striker member subassembly further comprises an upper portion and a lower portion, the upper portion being substantially flat and extending from the first end-portion to the second end-portion, the lower portion being curved, and having an arcuate surface opening in a generally positive direction when viewed along an imaginary axis formed by a set of Cartesian coordinate lines.

7. The chambered striker wildlife call assembly of claim 6, wherein:

said upper portion and said lower portion of said striker member assembly are laminated together such that the closed internal chamber is defined therebetween along said first end-portion of said striker member subassembly.

8. A chambered striker wildlife call assembly, for generating wildlife sounds, said wildlife call assembly comprising:

a striker member subassembly having a first end-portion and a second end-portion, the first end-portion defining therewithin an internally spaced, closed sound channel, and said first end-portion of said striker member subassembly having first and second sides and defining a self-contained, elongate pivot hinge channel, extending therethrough, between said first and second sides, having a continuous elongate perimeter; for permitting secured slideable movement along a longitudinal axis relative to the striker, and pivotal movement along other axes relative to said striker;

said striker member subassembly having an upper hinge support member, defining a channel therewithin having a generally elongate perimeter generally congruent to that of the elongate pivot hinge channel;

a lower box subassembly having first and second ends, and defining a open sound chamber therewithin having a first pair of opposing side walls, and a second pair of opposing side walls each having an upper widthwise surface having a range of points of accessible contact and a strike point, said first end of said lower box subassembly defining a hinge coupling space for receipt and pivotable attachment of said striker member subassembly; and coupling means for attaching said striker member subassembly to said lower box subassembly, for securement and movement along said self-contained, elongate pivot hinge channel of said striker, said coupling means extending through, and slideably retaining, the channel of said upper hinge support member and said elongate pivot hinge channel, while attaching to said hinge coupling space; such that the striker member can make optionable, frictionable and releasable contact with either of the second pair of opposing side walls of said lower box subassembly at preferred variable locations along the range of points of accessible contact and in relation to the strike point on said upper widthwise surface.

9. The chambered striker wildlife call assembly of claim 8, wherein:

said upper hinge support member of said striker member subassembly comprises first and second half-portions, defining the channel of the upper hinge support member between said half-portions, said first end-portion of said striker member subassembly further comprises a elongate pivot hinge channel collar member, said elongate pivot hinge channel collar member being insertable within and interfacable with the elongate pivot hinge channel of said first end-portion, and said striker member subassembly further comprises a lower hinge support member having first and second half-portions and defining a lower channel therewithin having a generally elongate perimeter, said lower hinge support member being fixedly attached to the first end-portion of the striker member subassembly such that the lower channel of the lower hinge support member is generally in axial alignment with the elongate pivot hinge channel of the striker member subassembly, said coupling means further extending through the lower channel of said lower hinge support member when said lower hinge support member is fixedly attached to the first end-portion of said striker member subassembly.

10. A chambered striker wildlife call assembly, for generating wildlife sounds, said wildlife call assembly comprising:

a striker member subassembly having a first end-portion and a second end-portion, and a top section and a bottom section affixed to and adjoining one another, the first end-portion and the bottom section defining an internally spaced, sound channel, the channel being substantially covered by said top section, and said first end-portion of said striker member subassembly defining an elongate pivot hinge channel, extending, widthways, therethrough, and having an elongate perimeter, said striker member subassembly having an upper hinge support member, defining a channel therewithin having a generally elongate perimeter congruent to that of the elongate pivot hinge channel;

a lower box subassembly having first and second ends, and defining a open sound chamber therewithin having a first pair of opposing side walls, and a second pair of opposing side walls each having an upper widthwise surface having a range of points of accessible contact and a strike point, said first end of said lower box subassembly defining a hinge coupling space for receipt and pivotable attachment of said striker member subassembly; and coupling hinge means for pivotably and slideably attaching said striker member subassembly to said lower box subassembly, said coupling hinge means extending through, and retaining, the channel of said upper hinge support member, said elongate pivot hinge channel and said hinge coupling space; such that the bottom section of said striker member can make optionable, frictionable and releasable contact with either of the second pair of opposing side walls of said lower box subassembly at preferred variable locations along the range of points of accessible contact and in relation to the strike point on said upper widthwise surface;

said bottom section and said top section, each, being laminate panel sections fixedly secured to one another, and said bottom section comprising an upper surface portion and a lower surface portion, each extending from said first end-portion to said second end-portion, the first end-portion of the bottom section defining a channel having a lower arced surface and a substantially flat surface portion spaced from the flower arced surface, bounding as a perimeter around the channel and extending from the first end-portion to the second end-portion of said bottom section, the lower arced surface opening in a generally positive direction along an imaginary axis formed by a set of Cartesian coordinate lines, said lower surface having a curved surface;

and wherein:

said coupling hinge means comprises:

a pin member, a upper washer member, defining therewithin a center axial space, a lower washer member, defining therewithin a center axial space, a biasing member, defining therewithin a center axial space, and a collar member, having vertical circular walls and defining therewithin a center axial space;

said upper hinge support member being positionally aligned for coupling over the top section of the striker member subassembly and the elongate pivot hinge channel of the first end-portion of said striker member subassembly and the upper washer member being positionally aligned for coupling over the upper hinge support member; such that the center axial space of the upper washer member, the channel of the upper hinge support member and the elongate pivot hinge channel of the first end-portion of said striker member subassembly are each in substantial axial alignment with one another;

said lower washer member being positionally aligned for coupling under the bottom section of the striker member subassembly and the elongate pivot hinge channel of the first end-portion of said striker member subassembly, and the biasing member and the collar member being positionally aligned for coupling under the lower washer member, the collar member being concentrically and axially positioned within the center axial space of said biasing member; such that the elongate pivot hinge channel, the center axial space of the lower washer member, the center axial space of the collar member and the center axial space of the biasing member are each in substantial axial alignment with one another;

and wherein:

said pin member is inserted through the upper washer member, the upper hinge support member, the elongate pivot hinge channel of the first end-portion of the striker member subassembly, the lower washer member, the collar member and the biasing member; each as positionally aligned for coupling; and adjustably and releasably attached and coupled within the coupling space of said lower box subassembly; so as to slideably and pivotably couple said striker member subassembly to said lower box subassembly such that optionable points and portions of the lower surface of the bottom section of said striker member subassembly can be brought to make frictionable contact with a preferred choice of the range of points of accessible contact on the upper widthwise surface of one of said second pair of opposing side walls of the open sound chamber of said lower box subassembly; and moved in relation to each of the strike points, for use in varying sound, tone and resonance of the wildlife sounds generated by said wildlife call assembly.

11. The chambered striker wildlife call assembly of claim 10, wherein:

said upper hinge support member of said striker member subassembly comprises a generally elliptical outer perimeter configuration.

12. The chambered striker wildlife call assembly of claim 11, wherein:

the first end-portion of said top section of said striker member subassembly further defines a support channel for moveable and rotatable interface of said upper hinge support member;

the elongate pivot hinge channel is defined within the bottom section of the first end-portion of said striker member subassembly; and said upper hinge support member is slideably rotatable such that its channel is positionally changed from a first position where the elongate perimeter of the channel is positionally oriented axial to a horizontal axis of the striker member subassembly, to a second position where the elongate perimeter is substantially transverse to the first position; such that the striker member assembly, when coupled to the lower box subassembly, is locked in a fixed position along the elongate pivot hinge channel.

13. The chambered striker wildlife call assembly of claim 12, wherein:

the upper hinge support member is circular in outer perimeter configuration and beveled, and the upper washer member is circular in outer perimeter configuration and beveled.

14. The chambered striker wildlife call assembly of claim 13, wherein:

said upper hinge support member further comprises a flange collar member attached adjacent to and extending from the elongate perimeter of the channel of said upper hinge support member, and defining a flange channel, said flange collar having an outer elongate perimeter congruent to the elongate perimeter of said elongate pivot hinge channel such that said flange collar is slideably receivable and interfacable with said elongate pivot hinge channel, said flange collar being slideably inserted within said elongate pivot hinge channel when said upper hinge support member is interfaced within the support channel of the first end-portion of said top section of said striker member subassembly.

15. The chambered striker wildlife call assembly of claim 11 wherein:

said upper hinge support member further comprises a flange collar member attached adjacent to and extending from the elongate perimeter of the channel of said upper hinge support member, and defining a flange channel, said flange collar having an outer elongate perimeter congruent to the elongate perimeter of said elongate pivot hinge channel such that said flange collar is slideably receivable and interfacable with said elongate pivot hinge channel, said flange collar being slideably inserted within said elongate pivot hinge channel when said upper hinge support member is interfaced within the support channel of the first end-portion of said top section of said striker member subassembly.

16. The chambered striker wildlife call assembly of claim 12, wherein:

when the channel of said upper hinge support member is slideable rotated and positionally changed from the first position to the second position, the bottom section of said striker member subassembly is positionally aligned to make direct frictionable contact with the strike point of the upper widthwise surface of at least one of said second pair of opposing side walls of said lower box subassembly.

17. The chambered striker wildlife call assembly of claim 13, wherein:

the first pair of opposing side walls and the second pair of opposing side walls have the general configuration when viewed from above of being generally trapazoid in configuration; when so viewed, the first pair of opposing side walls being the short sides of a trapezoid shape and the second pair of opposing side walls being the long sides of a trapezoid shape, and wherein:

at least one of said second pair of opposing side walls defining a closed chamber, generally vertically below and proximate to the widthwise surface of said second opposing side wall.

* * * * *